(12) United States Patent
Haga et al.

(10) Patent No.: US 10,798,117 B2
(45) Date of Patent: Oct. 6, 2020

(54) SECURITY PROCESSING METHOD AND SERVER

(71) Applicant: Panasonic Intellectual Property Corporation of America, Torrance, CA (US)

(72) Inventors: Tomoyuki Haga, Nara (JP); Hideki Matsushima, Osaka (JP); Manabu Maeda, Osaka (JP); Yoshihiro Ujiie, Osaka (JP); Takeshi Kishikawa, Osaka (JP); Junichi Tsurumi, Osaka (JP); Jun Anzai, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 16/004,492

(22) Filed: Jun. 11, 2018

(65) Prior Publication Data

US 2018/0295147 A1     Oct. 11, 2018

Related U.S. Application Data

(63) Continuation of application No. PCT/JP2016/004992, filed on Nov. 29, 2016.
(Continued)

(30) Foreign Application Priority Data

Oct. 13, 2016  (JP) .................................. 2016-201780

(51) Int. Cl.
*H04L 29/06* (2006.01)
*H04L 12/40* (2006.01)
(Continued)

(52) U.S. Cl.
CPC ........ *H04L 63/1425* (2013.01); *G07C 5/0808* (2013.01); *H04L 12/40* (2013.01);
(Continued)

(58) Field of Classification Search
USPC ................................................. 726/23, 1, 26
See application file for complete search history.

(56) References Cited

U.S. PATENT DOCUMENTS 8,527,013 B2 * 9/2013 Guba .................... H04W 4/027
                                                            455/569.2
2007/0018800 A1 * 1/2007 Boss ...................... B60Q 9/008
                                                            340/435
(Continued)

FOREIGN PATENT DOCUMENTS

CN        103295178 A      9/2013
EP        3346648 A1       7/2018
(Continued)

OTHER PUBLICATIONS

International Search Report of PCT application No. PCT/JP2016/004992 dated Feb. 28, 2017.
(Continued)

*Primary Examiner* — Maung T Lwin
(74) *Attorney, Agent, or Firm* — Greenblum & Bernstein, P.L.C.

(57) ABSTRACT

An anomaly detection server is provided. The anomaly detection server is a server for counteracting an anomalous frame transmitted on an on-board network of a single vehicle. The anomaly detection server acquires information about multiple frames received on one or multiple on-board networks of one or multiple vehicles, including the single vehicle. The anomaly detection server, acting as an assessment unit that, based on the information about the multiple frames and information about a frame received on the
(Continued)

on-board network of the single vehicle after the acquisition of the information about the multiple frames, assesses an anomaly level of the frame received on the on-board network of the single vehicle.

17 Claims, 20 Drawing Sheets

Related U.S. Application Data

(60) Provisional application No. 62/268,116, filed on Dec. 16, 2015.

(51) Int. Cl.
*G07C 5/08* (2006.01)
*H04W 4/44* (2018.01)
*H04W 4/40* (2018.01)
*H04L 29/08* (2006.01)
*H04W 4/08* (2009.01)

(52) U.S. Cl.
CPC .......... *H04L 63/1441* (2013.01); *H04L 67/12* (2013.01); *H04W 4/40* (2018.02); *H04W 4/44* (2018.02); *H04L 2012/40215* (2013.01); *H04L 2012/40273* (2013.01); *H04W 4/08* (2013.01)

(56) References Cited

U.S. PATENT DOCUMENTS

| | | | | |
|---|---|---|---|---|
| 2011/0172874 | A1* | 7/2011 | Patnaik | G06F 16/2474 701/31.4 |
| 2011/0264318 | A1* | 10/2011 | Laforge | G07C 5/008 701/22 |
| 2012/0242472 | A1* | 9/2012 | Walsh | G08B 21/12 340/438 |
| 2013/0204485 | A1* | 8/2013 | Chen | G06F 17/00 701/29.6 |
| 2013/0231826 | A1* | 9/2013 | Zhang | G06Q 10/20 701/29.3 |
| 2014/0328352 | A1* | 11/2014 | Mabuchi | H04L 12/4035 370/451 |
| 2014/0359760 | A1* | 12/2014 | Gupta | H04L 63/1408 726/22 |
| 2015/0358351 | A1* | 12/2015 | Otsuka | H04L 12/4625 726/23 |
| 2017/0076516 | A1* | 3/2017 | Morita | B60R 16/02 |

FOREIGN PATENT DOCUMENTS

| | | |
|---|---|---|
| JP | 2007-312193 | 11/2007 |
| JP | 2014-146868 | 8/2014 |
| JP | 2015-214169 | 12/2015 |

OTHER PUBLICATIONS

Keisuke Takemori et at., "Proposal of Log Analyzing System for IDS", IPSJ SIG Technical Report, 2003-CSEC-21, pp. 65-70, May 16, 2003 (Partial Translation).

The Extended European Search Report from the European Patent Office (EPO) dated Oct. 12, 2018 for the related European Patent Application No. 16875101.4.

The Extended European Search Report dated Dec. 17, 2019 for the related European Patent Application No. 19205319.7.

English Translation of Chinese Search Report dated May 21, 2020 for the related Chinese Patent Application No. 201680050843.X.

* cited by examiner

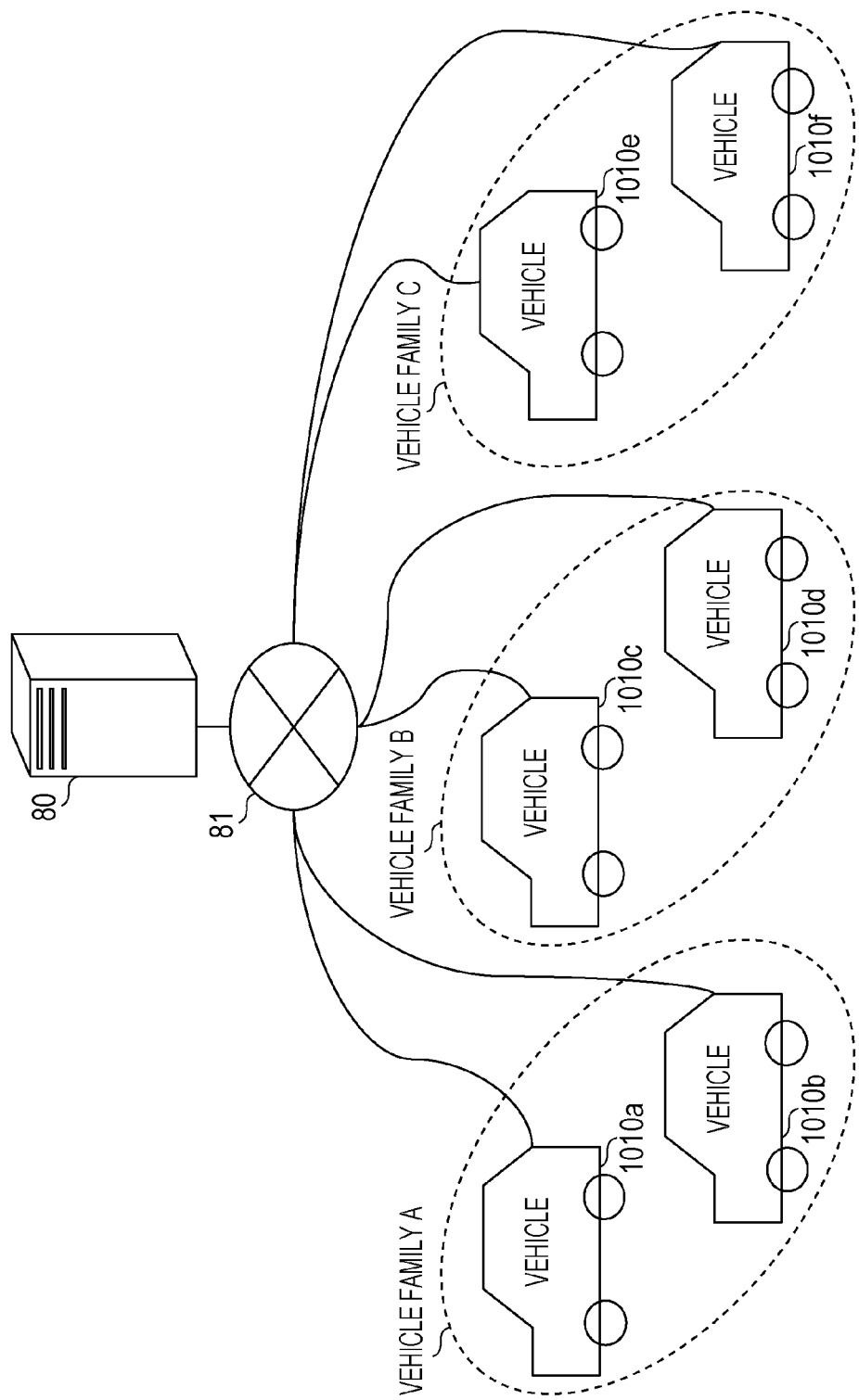

FIG. 6

| VEHICLE FAMILY | ECU ID | CAN ID |
|---|---|---|
| A | 001 | 100 |
| | | 101 |
| | 002 | 200 |
| B | 001 | 110 |
| | | 111 |
| | 003 | 301 |
| C | 004 | 400 |
| | 005 | 500 |

FIG. 7

| ATTACK CATEGORY | ATTACK PHASE | OBSERVED ATTACK EVENT | DETECTION COUNT N | ALERT LEVEL |
|---|---|---|---|---|
| SIGN OF ATTACK | PHASE 1 | TRIAL-AND-ERROR IN ONE VEHICLE | - | 1 |
| | PHASE 2 | ECU OVERWRITING PROCESS | 1 | 2 |
| | | | N > 1 | 3 |
| | PHASE 3 | VEHICLE IDENTIFICATION INFORMATION ACQUISITION REQUEST, ECU IDENTIFICATION INFORMATION ACQUISITION REQUEST | 1 | 3 |
| | | | N > 1 | 4 |
| ATTACK | PHASE 4 | UNAUTHORIZED CONTROL CONFIRMATION | 1 | 4 |
| | | | N > 1 | 5 |

FIG. 8

| ALERT LEVEL | CLASS A (VEHICLE IN WHICH SIGN OF ATTACK/ATTACK IS OBSERVED) | CLASS B (VEHICLE IN SAME VEHICLE FAMILY AS VEHICLE IN WHICH SIGN OF ATTACK/ATTACK IS OBSERVED) | CLASS C (VEHICLE IN DIFFERENT VEHICLE FAMILY HAVING ECU IN WHICH SIGN OF ATTACK/ATTACK IS OBSERVED) |
|---|---|---|---|
| 1 | NOTIFY (ALERT) | DO NOT NOTIFY | DO NOT NOTIFY |
| 2 | IMMEDIATELY NOTIFY (ALERT) | DO NOT NOTIFY | DO NOT NOTIFY |
| 3 | IMMEDIATELY NOTIFY (ALERT) | IMMEDIATELY NOTIFY (ALERT) | NOTIFY (ALERT) |
| 4 | IMMEDIATELY NOTIFY (ALERT & CONTROL INFORMATION) | DO NOT NOTIFY | DO NOT NOTIFY |
| 5 | IMMEDIATELY NOTIFY (ALERT & CONTROL INFORMATION) | IMMEDIATELY NOTIFY (ALERT) | IMMEDIATELY NOTIFY (ALERT) |

| CUMULATIVE DETECTED VEHICLE COUNT N | ALERT LEVEL |
|---|---|
| 1 | 1 |
| 2 | 2 |
| 2 < N ≤ 10 | 3 |
| 10 < N ≤ 100 | 4 |
| 100 < N ≤ 1000 | 5 |
| 1000 < N ≤ 10000 | 6 |

FIG. 12B

| DETECTED VEHICLE COUNT N PER UNIT TIME | ALERT LEVEL |
|---|---|
| 1 | 1 |
| 2 | 2 |
| 2 < N ≤10 | 3 |
| 10 < N ≤100 | 4 |
| 100 < N ≤1000 | 5 |
| 1000 < N ≤10000 | 6 |

FIG. 12C

| DISTANCE D (km) BETWEEN 2 DETECTED ATTACKS | ALERT LEVEL |
|---|---|
| D > 500 | 1 |
| 200 < D ≤ 500 | 2 |
| 200 < D ≤ 500 | 3 |
| 100 < D ≤ 200 | 4 |
| 10 < D ≤100 | 5 |
| D ≤ 10 | 6 |

FIG. 12D

| CAN ID | ALERT LEVEL |
|---|---|
| 301, 302, 303 | 1 |
| 101, 102 | 2 |
| 201, 202 | 3 |
| 401, 402 | 4 |
| 501, 502 | 5 |
| 601, 602, 701 | 6 |

| ANOMALY LEVEL | ALERT LEVEL |
|---|---|
| 1 | 1 |
| 2 | 2 |
| 3 - 4 | 3 |
| 5 - 10 | 4 |
| 11 - 20 | 5 |
| 21 - | 6 |

FIG. 14

| VEHICLE FAMILY | ECU ID | CAN ID | MAC SUPPORT | ENCRYPTION |
|---|---|---|---|---|
| A | 001 | 100 | Y | N |
| A | 001 | 101 | N | Y |
| A | 002 | 200 | Y | N |
| B | 001 | 110 | N | Y |
| B | 001 | 111 | Y | Y |
| B | 003 | 301 | N | Y |
| C | 004 | 400 | N | Y |
| C | 005 | 500 | N | Y |

SECURITY PROCESSING METHOD AND SERVER

BACKGROUND

1. Technical Field

The present disclosure relates to security technology for detecting and counteracting attack frames which may be transmitted in an on-board network over which electronic control units installed in vehicles communicate.

2. Description of the Related Art

Recently, in systems inside automobiles, devices called electronic control units (ECUs) are being disposed in large numbers. A network joining these ECUs is called an on-board network. Various standards exist for on-board networks. One of the most prevalent on-board network standards is called a controller area network (CAN) prescribed in ISO 11898-1.

SUMMARY

In a CAN, the communication link is a bus (CAN bus) formed by two wires, and an ECU connected to the bus is called a node. Each node connected to a CAN bus transmits and receives frames (messages). In addition, in a CAN, identifiers that indicate the destination and the source of a transmission do not exist, and instead, the transmitting node transmits while attaching an ID called a message ID to each frame, while each receiving node receives only a predetermined message ID. In systems inside automobiles, numerous ECUs exchange various frames with each other.

By connecting an unauthorized node to a CAN bus, or by attacking an ECU or the like having a function of communicating with a mobile information terminal, a communication device outside the vehicle, or the like, and turning the ECU into an unauthorized node, or the like, it is possible for an attacker to transmit attack frames to the CAN bus and control an automobile in an unauthorized manner. An attack frame is a frame transmitted to a CAN bus by an unauthorized attacker, and is a frame that originally would not be transmitted in the normal state of the on-board network.

As a technology for detecting and defending against such attack frames, there is known a technology that pre-registers an anticipated period for frames having a message ID that should be transmitted periodically on the on-board network, and discriminates whether or not a frame is unauthorized on the basis of the anticipated period (see Japanese Unexamined Patent Application Publication No. 2014-146868).

However, with the technology of Japanese Unexamined Patent Application Publication No. 2014-146868, the attack frames which can be detected are limited to attack frames which can be discriminated using registered anticipated periods, and thus the technology is not necessarily effective at detecting and defending against a variety of attack frames.

One non-limiting and exemplary embodiment provides a security processing method that is useful for appropriately counteracting a variety of attack frames which may be transmitted on an on-board network. Also provided is a server (server device) that is useful for appropriately counteracting a variety of attack frames.

In one general aspect, the techniques disclosed here feature a security processing method, executed by a computer, for counteracting an anomalous frame transmitted on an on-board network of a single vehicle. The security processing method includes: acquiring, by the computer, information about multiple frames received on one or multiple on-board networks of one or multiple vehicles; and assessing, by the computer, an anomaly level of a frame received on the on-board network of the single vehicle after the reception of the multiple frames, based on the acquired information about the multiple frames.

It should be noted that general or specific embodiments may be implemented as a device, a system, an integrated circuit, a computer program, a computer-readable recording medium such as a CD-ROM disc, or any selective combination thereof.

According to the present disclosure, the anomaly level (that is, the degree to which a frame is an anomaly) of a frame received on a certain on-board network is assessed, and as a result, appropriate counteraction against a variety of attack frames that originally would not be transmitted in the normal state of the on-board network may become possible.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 2 is a diagram illustrating an overall configuration of an on-board network management system according to Embodiment 1;

FIG. 6 is a diagram illustrating an example of vehicle information stored in a vehicle information DB of the anomaly detection server according to Embodiment 1;

FIG. 7 is a diagram illustrating an example of attack phase information stored in a security information DB of the anomaly detection server according to Embodiment 1;

FIG. 8 is a diagram illustrating an example of alert level information stored in the security information DB of the anomaly detection server according to Embodiment 1;

FIG. 12B is a diagram illustrating Example 2 of alert level deciding information in Embodiment 1;

FIG. 12C is a diagram illustrating Example 3 of alert level deciding information in Embodiment 1;

FIG. 12D is a diagram illustrating Example 4 of alert level deciding information in Embodiment 1;

FIG. 14 is a diagram illustrating an example of a MAC/encryption-protected message ID list used by the anomaly detection server according to Embodiment 3;

DETAILED DESCRIPTION

Figure 1A:
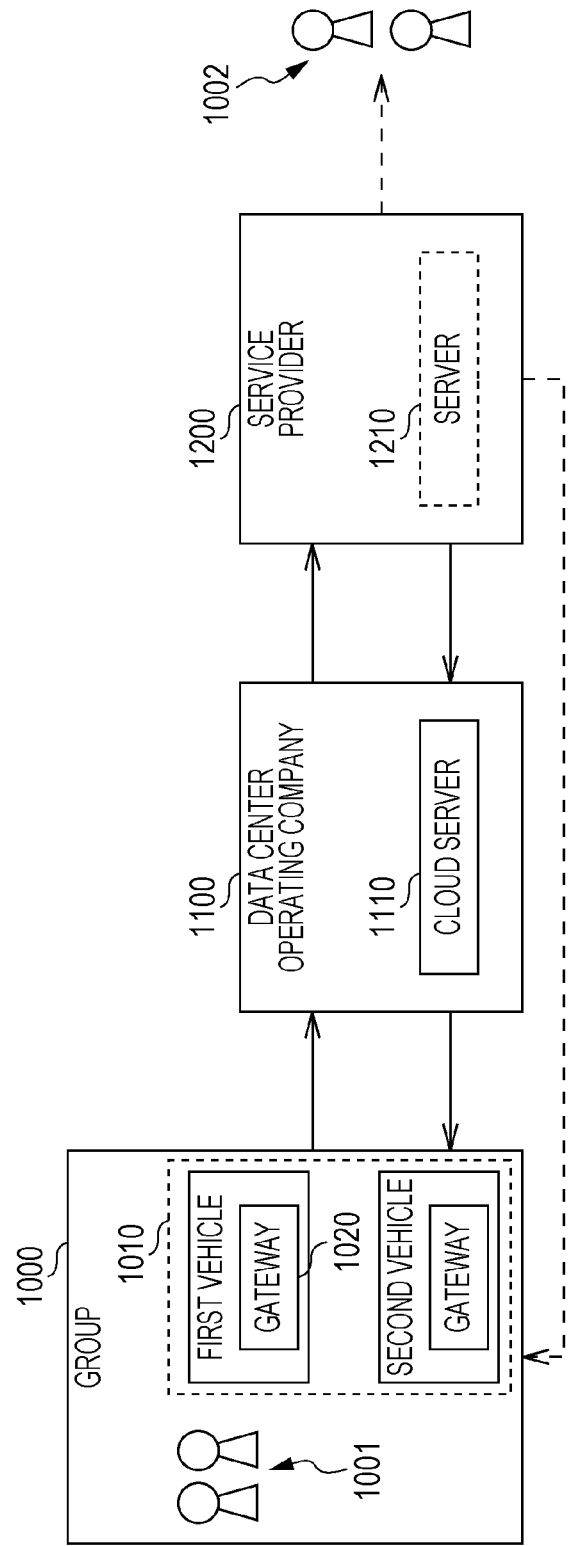
FIG. 1A is a conceptual diagram illustrating an example of a mode of a service provided by an on-board network management system according to an embodiment.

A security processing method according to one aspect of the present disclosure is a security processing method, executed by a computer, for counteracting an anomalous frame transmitted on an on-board network of a single vehicle. The security processing method includes: acquiring, by the computer, information about multiple frames received on one or multiple on-board networks of one or multiple vehicles; and assessing, by the computer, an anomaly level of a frame received on the on-board network of the single vehicle after the reception of the multiple frames, based on the acquired information about the multiple frames. In the security processing method, by acquiring (collecting) information about multiple frames already received on an on-board network, the assessment of an appropriate anomaly level becomes possible through the application of statistical processing, multivariate analysis, machine learning, and the like, for example. With this arrangement, the assessed anomaly level may express anomalies that go undetected by fraud detection techniques based on existing rules such as a blacklist (for example, attack frames related to a sign of attack, a hitherto unknown attack, and the like). On the basis of the anomaly level, appropriately counteracting an attack frame becomes possible.

In another exemplary configuration, the acquired information about the multiple frames includes at least partial content of the frames, an acquisition of the acquired information about the multiple frames is a successive acquisition of information about each of the multiple frames, in the security processing method, a designated model is successively updated based on the successively acquired information about the multiple frames, and an assessment of the anomaly level of the frame received on the on-board network of the single vehicle is performed by computational processing using information about the frame, and the designated model. With this arrangement, for example, the anomaly level may be assessed by computational processing including one or a combination of various processes, such as comparison between a designated model reflecting information about frames received on the on-board network of each vehicle, and the frame whose anomaly level is to be assessed, arithmetic computation, logical computation, conditional judgment, and the like. The designated model is useful for classifying the anomaly level into multiple stages. For example, the designated model may be updated by statistical processing, machine learning, and the like. Since the designated model is successively updated, it is possible to assess the anomaly level appropriately in correspondence with the most recent conditions of each vehicle.

In another exemplary configuration, the designated model is successively updated by machine learning, based on the successively acquired information about the multiple frames. With this arrangement, the anomaly level may be assessed appropriately by machine learning. Additionally, it becomes possible to address hitherto unknown attacks on the basis of the assessed anomaly level.

In another exemplary configuration, the security processing method includes: performing the acquiring by having a server communicable with the one or multiple vehicles and the single vehicle acquire the information about the multiple frames received on the on-board network of each vehicle from each of the one or multiple vehicles; having the server receive information about the frame received on the on-board network of the single vehicle from the single vehicle; performing an assessment of the anomaly level of the frame involving the information about the frame, based on the information about the multiple frames; deciding content of transmission information to be transmitted to the single vehicle in accordance with the anomaly level assessed in the assessment; and transmitting, by the sever, the transmission information with the content to the single vehicle. With this arrangement, since the transmission of the transmission information is performed by a server (for example, a computer external to the vehicle, such as a cloud server) in accordance with the anomaly level assessed for the frame received on the on-board network of the single vehicle, in the case in which the frame is anomalous, it becomes possible to take counteraction (such as an alert notification and control of the vehicle) utilizing the transmission information in a vehicle receiving the transmission information.

In another exemplary configuration, the information about the frame received on the on-board network of the single vehicle includes identification information of the frame, and in the deciding, the content of the transmission information is decided in accordance with the identification information of the frame in a case in which the anomaly level of the frame assessed in the assessment indicates that the frame is anomalous. With this arrangement, it becomes possible to take appropriate security countermeasures with respect to attack phases (each phase of a sign of attack or an attack) which may be classified according to the identification information of the anomalous frame, for example.

In another exemplary configuration, in the deciding, in a case in which the identification information of the frame whose anomaly level is assessed to indicate that the frame is anomalous in the assessment is certain identification information, control information giving an instruction to stop running or reduce a running speed of the single vehicle is included in the transmission information. With this arrangement, by deciding the certain identification information to be predetermined identification information (a message ID) for frames important to the running of the vehicle, it becomes possible to realize security countermeasures that appropriately cause the vehicle to switch to a safer state.

In another exemplary configuration, in the transmitting, it is decided, as a decision, whether or not to transmit certain transmission information to vehicles having a certain relationship with the single vehicle in accordance with the anomaly level assessed in the assessment, and a transmission of the certain transmission information is controlled by following the decision. With this arrangement, since information for security is transmitted not only to the vehicle attacked by an attacker (the vehicle in which an attack frame is present on the on-board network), but also to vehicles having a certain relationship with the vehicle (such as vehicles in the same vehicle family, or vehicles including the same type of ECU, for example), security countermeasures and the like for preemptively stopping an attack on the vehicles having the certain relationship may be possible.

In another exemplary configuration, the information about the frame received on the on-board network of the single vehicle includes identification information of the frame, and in the transmitting, it is decided whether or not to transmit the certain transmission information to vehicles having a same configuration of the on-board network as the single vehicle, in accordance with the identification information of the frame in a case in which the anomaly level of the frame assessed in the assessment indicates that the frame is anomalous, and a transmission of the certain transmission information is controlled by following the decision. With this arrangement, for example, information and the like for ensuring security may be transmitted to vehicles having the same configuration of the on-board network (for example, vehicles in the same vehicle family) as the vehicle in which an anomalous frame is detected, in accordance with an attack phase which may be classified according to the identification information of the anomalous frame. For this reason, for example, security countermeasures for limiting the damage of an attack on multiple vehicles in the same vehicle family may become possible.

In another exemplary configuration, the information about the frame received on the on-board network of the single vehicle includes identification information of the frame, and in the transmitting, it is decided whether or not to transmit the certain transmission information to vehicles provided with an electronic controller of a same type as an electronic controller that transmits the frame identified by the identification information in the on-board network of the single vehicle, in accordance with the identification information of the frame in a case in which the anomaly level of the frame assessed in the assessment indicates that the frame is anomalous, and a transmission of the certain transmission information is controlled by following the decision. With this arrangement, for example, information and the like for ensuring security may be transmitted to vehicles provided with an ECU of the same type (such as vehicles in the same vehicle family as the vehicle in which the anomaly is detected, or vehicles in a different vehicle family provided with the same model of ECU, for example) as the vehicle in which an anomalous frame is detected, in accordance with an attack phase which may be classified according to the identification information of the anomalous frame. For this reason, security countermeasures for limiting the damage of an attack on each vehicle provided with the same type of ECU as an ECU placed under the control of an attacker in order to transmit an attack frame may become possible.

In another exemplary configuration, in the transmitting, a transmission time of transmission information to transmit to the single vehicle is decided in accordance with the anomaly level assessed in the assessment, and the transmission information is transmitted to the single vehicle at the transmission time. With this arrangement, information for security (such as an alert notification, for example) may be transmitted at an appropriate time, such as being transmitted more rapidly as the anomaly level goes higher, for example.

In another exemplary configuration, in the deciding, in a case in which the anomaly level of the frame assessed in the assessment indicates that the frame is anomalous, when a same anomaly as an anomaly related to the frame is already occurring in one or multiple vehicles having a same configuration of the on-board network as the single vehicle, the content of the transmission information to be transmitted to the single vehicle is decided based on a number of vehicles in which the anomaly is occurring or a distance between the single vehicle and the vehicles in which the anomaly is occurring. The same anomaly is, for example, an anomaly in frames transmitted by the same type of ECU, an anomaly in frames having the same identification information, or the like. Whether or not an anomaly is occurring may be distinguished by assessing the anomaly level of vehicles other than the single vehicle similarly to the single vehicle, for example. The number of vehicles in which the same anomaly is occurring may be the total number, or the number per unit time. With this arrangement, it becomes possible to estimate the scale or the like of an attack by an attacker, and in accordance with the scale or the like, take appropriate security countermeasures by the transmission of required information.

In another exemplary configuration, in the deciding, in a case in which the anomaly level of the frame assessed in the assessment indicates that the frame is anomalous, fraud detection information indicating a rule or an algorithm for detecting a same anomaly as an anomaly on the on-board network is included in the transmission information. With this arrangement, it becomes possible to deliver fraud detection information for performing fraud detection in the local environment of a vehicle from the server, thereby making it possible to raise the security of the vehicle.

In another exemplary configuration, the information about the frame received on the on-board network of the single vehicle includes identification information of the frame, and in the deciding, in a case in which the anomaly level of the frame assessed in the assessment indicates that the frame is anomalous, when the identification information of the frame is prescribed in advance for a frame for transmitting data by applying cryptographic processing technology, control information giving an instruction to update a key used when applying the cryptographic processing technology is included in the transmission information. With this arrangement, for example, the security countermeasure of updating a key is performed in association with the detection of an attack involving a frame protected by cryptographic processing technology, thereby making it possible to reduce the damage due to the leak of the key or the like.

Also, a server according to one aspect of the present disclosure is a server for counteracting an anomalous frame transmitted on an on-board network of a single vehicle, including processing circuitry, and a storage including at least one set of instructions that, when executed by the processing circuitry, causes the processing circuitry to perform operations including: acquiring information about multiple frames received on one or multiple on-board networks of one or multiple vehicles, the one or multiple vehicles including the single vehicle; and assessing, based on the acquired information about the multiple frames and information about a frame received on the on-board network of the single vehicle acquired after an acquisition with respect to the multiple frames, an anomaly level of the frame received on the on-board network of the single vehicle. On the basis of the anomaly level assessed by the server, appropriate counteraction against a variety of attack frames may be possible.

Also, a security processing method according to one aspect of the present disclosure is a security processing method, executed by a computer, for counteracting an anomalous frame transmitted on an on-board network of a single vehicle, the security processing method including: assessing, by the computer, an anomaly level of a frame received on the on-board network of the single vehicle; deciding, by the computer, whether or not to transmit transmission information to vehicles having a certain relationship with the single vehicle in accordance with the assessed anomaly level; and controlling, by the computer, a transmission of the transmission information by following a decision of the deciding. With this arrangement, since whether or not to transmit information to other vehicles as a security countermeasure is switched in accordance with the anomaly level of a frame in the single vehicle, appropriate security countermeasures may be possible.

Note that these general or specific aspects may also be realized by a system, method, integrated circuit, computer program, or computer-readable recording medium such as a CD-ROM disc, and may also be realized by an arbitrary combination of a system, method, integrated circuit, computer program, and recording medium.

Hereinafter, an on-board network management system including a server and using a security processing method according to the embodiment will be described with reference to the drawings. Each of the embodiments indicated herein illustrates a specific example of the present disclosure. Consequently, features such as numerical values, component elements, layout positions and connection states of component elements, as well as steps and the ordering of steps indicated in the following embodiments are merely examples, and are not intended to limit the present disclosure. Among the component elements in the following embodiments, component elements that are not described in the independent claims are arbitrary or optional component elements. Also, each diagram is a schematic diagram, and does not necessarily illustrate a strict representation.

(Overview of Provided Service)

First, a mode of the service provided by the on-board network management system in the present embodiment will be described.

FIG. 1A is a diagram illustrating an example of a mode of the service provided by the on-board network management system in the present embodiment. The on-board network management system is provided with a group 1000, a data center operating company 1100, and a service provider 1200.

The group 1000 is an organization such as a corporation, association, or home, for example, and may be of any scale. The group 1000 includes multiple vehicles 1010 (a first vehicle, a second vehicle, and so on), and each vehicle is provided with a gateway 1020. The multiple vehicles 1010 include devices able to connect to the Internet (such as the gateway 1020, a head unit, and a telematics module), as well as devices which are unable to connect to the Internet by themselves (such as an engine ECU, for example). Each of the multiple vehicles 1010 may include devices such as various types of ECUs which are able to connect to the Internet via the gateway 1020 or the head unit, telematics module, or the like, by going through an in-vehicle network (on-board network). Note that each vehicle does not necessarily have to include the gateway 1020. A user 1001 may use a vehicle among the multiple vehicles 1010.

Figure 1B:
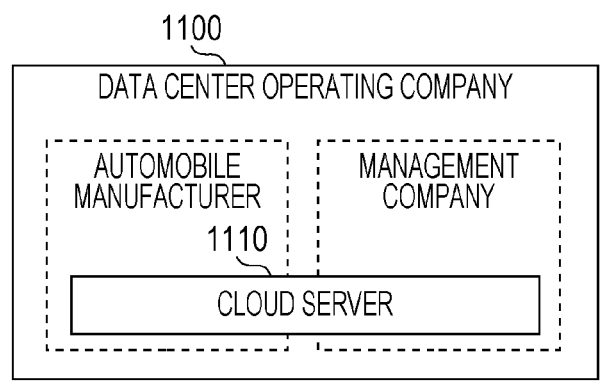
FIG. 1B is a conceptual diagram illustrating an example of a data center operating company according to the embodiment.

The data center operating company 1100 is equipped with a cloud server 1110. The cloud server 1110 is a computer that interacts with various equipment via the Internet, and is a virtualized server, for example. For example, the cloud server 1110 manages information such as big data that is difficult to handle using ordinary database management tools or the like. The data center operating company 1100 conducts activities such as managing data, managing the cloud server 1110, and running a data center used to conduct such management. Note that the data center operating company 1100 is not limited to being a management company that only provides data management or management of the cloud server 1110, and may also be a company that provides additional services. For example, the data center operating company 1100 may also be an automobile manufacturer that develops or manufactures all or part of the multiple vehicles 1010, for example. Also, the data center operating company 1100 is not limited to being a single company, and as illustrated in FIG. 1B, for example, in the case in which the automobile manufacturer and a management company jointly or separately provide data management or management of the cloud server 1110, both the automobile manufacturer and the management company may correspond to the data center operating company 1100. Also, only one of the automobile manufacturer and the management company may also function as the data center operating company 1100. Note that the cloud server 1110 described above may be realized by a specific program for realizing the functions required for data management and the like.

The service provider 1200 is equipped with a server 1210. The server 1210 is realized by one or multiple computers of any scale, for example, and may be equipped with storage such as high-capacity hard disks as a storage medium, or may be equipped with only memory and the like internal to the PC, for example. Note that the server 1210 itself may also not be equipped with a storage medium, and may also use an external storage medium. In addition, the service provider 1200 may also not be provided with the server 1210 in some cases.

Next, the flow of information in the on-board network management system of the above mode will be described.

First, each of the multiple vehicles 1010 (first vehicle, second vehicle, and so on) of the group 1000 transmits log information, which is information successively acquired in each vehicle, to the cloud server 1110 of the data center operating company 1100. The cloud server 1110 receives and collects the log information from each vehicle. Herein, the log information that each vehicle transmits to the cloud server 1110 includes, for example, information related to the content of frames (messages) flowing on the CAN bus constituting the on-board network, and the reception timing (such as the interval and frequency). As the content of frames flowing on the CAN bus, or as individual information, the log information may include vehicle status information, such as the amounts of accelerator and brake displacement, the shift (gearshift) status, the engine speed, the steering angle, and the vehicle speed, and also information about the position of the vehicle, and the like. The log information transmitted by each vehicle additionally includes vehicle identification information (a vehicle ID), and may also include various information acquired from equipment wirelessly connected to the vehicle by vehicle-to-infrastructure communication, vehicle-to-vehicle communication, or the like. Note that the log information may be transmitted to the cloud server 1110 directly from each of the multiple vehicles 1010 themselves over the Internet, or may be transmitted via another device such as a roadside unit.

Next, the cloud server 1110 of the data center operating company 1100 provides information based on the collected log information to the service provider 1200. For example, the cloud server 1110 transmits information based on the collected log information to the server 1210 of the service provider 1200, either in real-time or at arbitrary timings. This information based on the log information may include the same information as at least part of the log information, or may be information which does not include the same information, and instead is obtained as a result of performing a process such as calculation on the log information. Additionally, the units of transmission of the information based on the log information may be any kind of units. The server 1210 acquires information from the cloud server 1110.

Additionally, the service provider 1200 (for example, the server 1210), in correspondence with information from the cloud server 1110, specifies provision information to provide to the user 1001 or the multiple vehicles 1010, and transmits the provision information to the cloud server 1110 to enable the information to be provided to the user 1001 or the multiple vehicles 1010. The provision information may be, for example, information for warning the user 1001, information for running control or the like of a vehicle, and the like. The cloud server 1110 forwards the provision information from the server 1210 to one or more vehicles among the multiple vehicles 1010, or performs a process such as calculation (such as a process of organizing the information to suit a service to provide to the user) on the provision information, and transmits information obtained as a result to the one or more vehicles. A vehicle receiving the information operates on the basis of the information, and provides information to the user 1001 through a user interface such as a display, for example. The user provided with information may be the user 1001 who uses one of the multiple vehicles 1010, or an external user 1002. The user 1002 may be an automobile manufacturer, an ECU vendor (ECU supplier), or the like, for example. Note that instead of the service provider 1200, the cloud server 1110 of the data center operating company 1100 may organize the information based on the log information to suit the service to provide to the user 1001. Additionally, the cloud server 1110 may also transmit such organized information to the service provider 1200. Also, the server 1210 may be made to acquire the log information and provide the provision information by communicating with one or more vehicles among the multiple vehicles 1010, without going through the cloud server 1110. In addition, the service provider 1200 may be omitted, and the cloud server 1110 may specify the provision information on the basis of the collected log information, and provide the provision information to the user 1001 or the multiple vehicles 1010.

In addition, the on-board network management system may also be a mode different from the example described above. For example, in the on-board network management system, the data center operating company 1100 and the service provider 1200 may be omitted. For example, one of the vehicles among the multiple vehicles 1010 may be provided with a function that collects log information from the local vehicle itself and one or more other vehicles, similarly to the cloud server 1110. The vehicle may then specify provision information on the basis of the collected log information, and utilize the provision information in the local vehicle itself, or provide the provision information to other vehicles.

Embodiment 1

The following will describe an on-board network management system that includes multiple vehicles equipped with an on-board network (on-board network system) in which multiple electronic control units (ECUs) communicate on a CAN bus, and a server (anomaly detection server), as well as a security processing method that acts as a security technology used in such an on-board network management system. The security processing method is a method of assessing the anomaly level of a frame in an on-board network of a certain vehicle, to thereby enable appropriate counteraction in the case in which a frame transmitted on the CAN bus used for communication among each of the ECUs provided in the vehicle is suspected of being an attack frame. Anomaly level assessment is useful for flexibly engaging security countermeasures (such as alert notifications and defenses) with respect to anomalous frames. An attack frame is a frame transmitted on a CAN bus by an unauthorized attacker, and for example, is a frame that carries out an attack on the running functions of a vehicle (functions such as running, turning, and stopping), or a frame that acts as a precursor (sign of attack) for carrying out such an attack.

Herein, an on-board network management system will be described, with focus on an anomaly detection server that may collect and analyze log information (such as information about frames transmitted on an on-board network, and a vehicle ID) from multiple vehicles (automobiles), assess the anomaly level of a frame transmitted on the CAN bus inside a certain vehicle, and in accordance with the anomaly level, transmit information (a warning, information for running control or the like) to that vehicle or other vehicles. Note that the anomaly detection server may be a device provided in a single vehicle, or may be the cloud server 1110 or the server 1210 described above. The description herein supposes an example in which the anomaly detection server is the cloud server 1110 described above.

[1.1 Overall Configuration of On-Board Network Management System]

FIG. 2 is a diagram illustrating an overall configuration of an on-board network management system according to the present embodiment. In the on-board network system, an anomaly detection server 80 and vehicles 1010*a*, 1010*b*, 1010*c*, 1010*d*, 1010*e*, and 1010*f* are connected by a network 81 that acts as a communication link. The network 81 may include the Internet and the like. The anomaly detection server 80 corresponds to the cloud server 1110 illustrated in FIG. 1A, and the vehicles 1010*a*, 1010*b*, 1010*c*, 1010*d*, 1010*e*, and 1010*f* correspond to the multiple vehicles 1010 illustrated in FIG. 1A. The vehicles 1010*a*, 1010*b*, 1010*c*, 1010*d*, 1010*e*, and 1010*f* are provided with an on-board network that includes multiple ECUs connected to various equipment such as control devices, sensors, actuators, and user interface devices inside the vehicle. The multiple ECUs perform frame-related communication over a bus inside the vehicle (CAN bus). On the on-board network in each vehicle, each ECU communicates in accordance with the CAN protocol. Frames in the CAN protocol include data frames, remote frames, overload frames, and error frames. The description herein will mainly focus on data frames. Note that a data frame in CAN is prescribed to include information such as an ID field that stores an ID (message ID), a data length code (DLC) that indicates the data length, and a data field that stores data.

The vehicles 1010*a* and 1010*b* are vehicle family A, the vehicles 1010*c* and 1010*d* are vehicle family B, and the vehicles 1010*e* and 1010*f* are vehicle family C. Herein, vehicles of the same vehicle family have the same configuration of the on-board network. In other words, vehicles of the same vehicle family are vehicles of the same model (vehicle model), for example, and vehicles for which part of the vehicle ID that acts as identification information of the vehicle is the same. As one example, vehicles of the same vehicle family are vehicles having the same value of the model in a chassis number, or having the same value of the digits from the beginning up to the serial number in the vehicle identification number (VIN). In multiple vehicles of the same vehicle family, the specifications related to the usage of data frames (messages) flowing on the CAN bus of the on-board network (such as the prescribed content in the data fields for each message ID) are the same. In addition, vehicles of different vehicle families sometimes may be provided with ECUs of the same type. ECUs of the same type refers to ECUs having the same configuration, such as ECUs of the same model by the same manufacturing business (ECU vendor), and also including ECUs having the same configuration for realizing a principal function, for example. In the case in which vehicles of different vehicle families are provided with ECUs of the same type, the IDs (message IDs) of frames transmitted by the same type of ECU in each vehicle may be different from each other.

[1.2 Configuration of On-Board Network System]

Figure 3:
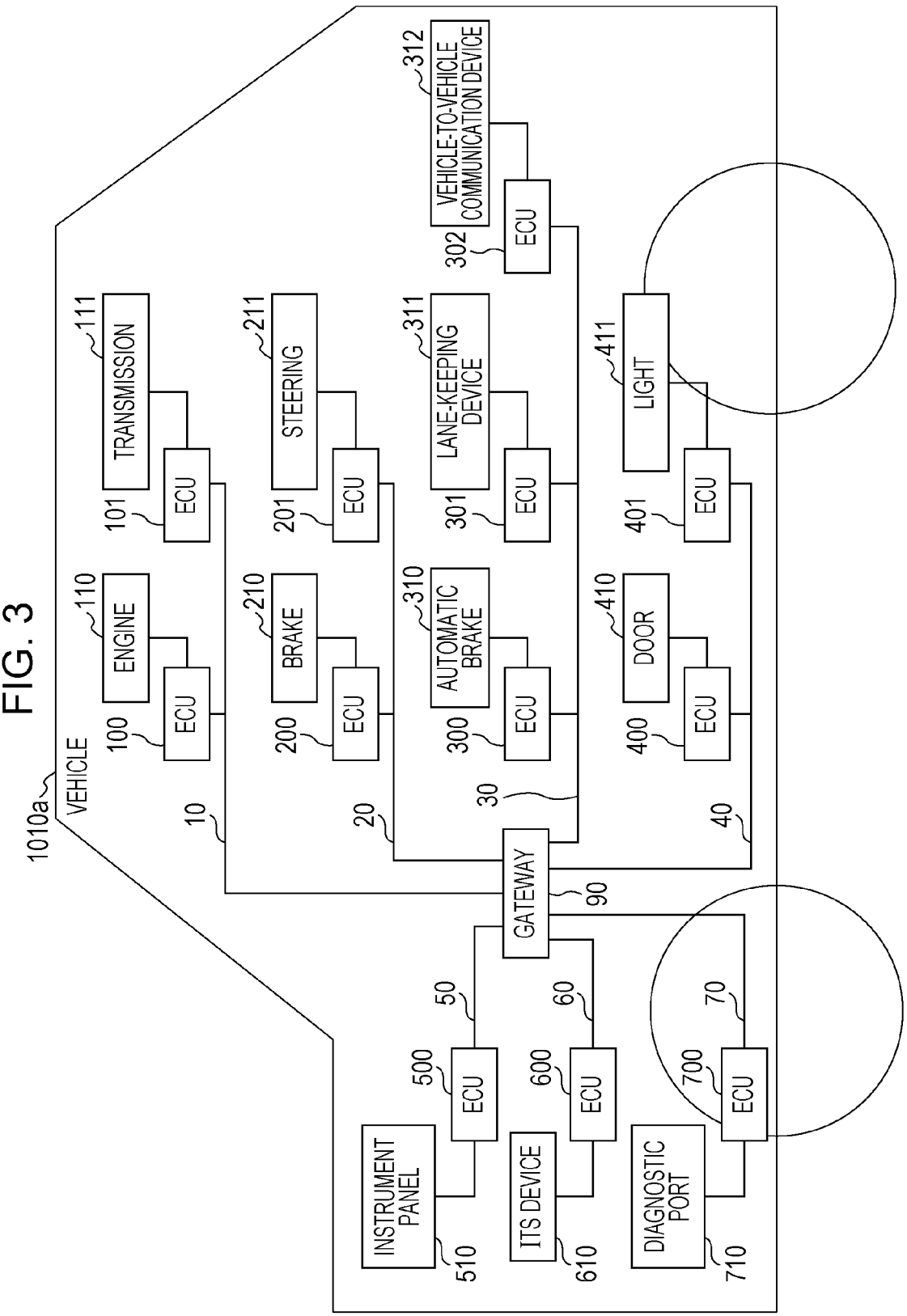
FIG. 3 is a diagram illustrating an example of the configuration of the on-board network system according to Embodiment 1.

FIG. 3 is a diagram illustrating an example of the configuration of the on-board network system in the vehicle 1010a of vehicle family A (the vehicle 1010b is also similar). Vehicles of other vehicle families are provided with a configuration similar to the configuration illustrated in FIG. 3, a partially different configuration, or the like.

The on-board network system in the vehicle 1010a and the like is configured to include nodes, such as multiple ECUs (ECUs 100, 101, 200, 201, 300, 301, 302, 400, 401, 500, 600, and 700) and a gateway 90, which are connected by buses (CAN buses) 10 to 70. Note that, although omitted from FIG. 3, the on-board network system may include even more ECUs. An ECU is a device that includes digital circuits such as a processor (microprocessor) and memory, analog circuits, communication circuits, and the like. The memory is memory such as ROM and RAM, and is able to store a control program (computer program) executed by the processor. For example, by having the processor operate by following the control program (computer program), the ECU realizes various functions. Note that the computer program herein is made up of a plural combination of instruction codes indicating commands to the processor in order to achieve a designated function.

Connected to the bus 10 are drive-related ECUs associated with the "running" (travel) of the vehicle, such as control of the motor, fuel, and battery, including the ECU (engine ECU) 100 and the ECU (transmission ECU) 101 connected to the engine 110 and the transmission 111, respectively.

Connected to the bus 20 are chassis-related ECUs associated with control of the behavior of the vehicle and the like, such as "turning" and "stopping", including the ECU (brake ECU) 200 and the ECU (steering ECU) 201 connected to the brake 210 and the steering 211, respectively.

Connected to the bus 30 are safety and comfort function-related ECUs and vehicle-to-vehicle communication ECUs associated with an inter-vehicular distance maintenance function, a collision avoidance function, airbags, and the like, including the ECU 300, the ECU 301, and the ECU 302 connected to the automatic brake 310, the lane keeping device 311, and the vehicle-to-vehicle communication device 312, respectively.

Connected to the bus 40 are body-related ECUs associated with control of the equipment in the vehicle, such as the air conditioner, turn signals, and the like, including the ECU 400 and the ECU 401 connected to the doors 410 and the lights 411, respectively.

Connected to the bus 50 are infotainment-related ECUs associated car navigation, audio, and the like, including the ECU 500 (head unit) connected to the instrument panel 510. Note that the allotment of functions between the instrument panel 510 and the head unit (ECU 500) may be configured in any way.

Connected to the bus 60 are ITS-related ECUs corresponding to highway traffic systems such as the Electronic Toll Collection System (ETC), including the ECU 600 connected to the intelligent transport systems (ITS) device 610.

Connected to the bus 70 is the ECU 700 connected to the diagnostic port 710, which is an interface for communicating with an external diagnostic tool (fault diagnostic tool), such as On-Board Diagnostics 2 (OBD2) or the like, for example. Note that the ECU 700 may be omitted and the diagnostic port 710 may be connected to the bus 70. The pieces of equipment connected to the ECUs connected to each bus indicated herein are merely one example, and such equipment may be substituted with one or multiple other pieces of equipment, or may be omitted, for example.

Each ECU (such as the ECU 100 or 200) acquires the status of the connected equipment (such as the engine 110 or the brake 210), and periodically transmits a frame expressing the status or the like on the on-board network, or in other words, the CAN bus.

The ECUs 100 and 101 connected to the bus 10, the ECUs 200 and 201 connected to the bus 20, and the ECUs 300, 301, and 302 connected to the bus 30 are MAC-supporting ECUs, and include functions (MAC generation function, MAC verification function) for processing a message authentication code (MAC). Also, the ECUs 400 and 401 connected to the bus 40, the ECU 500 connected to the bus 50, the ECU 600 connected to the bus 60, and the ECU 700 connected to the bus 70 are non-MAC-supporting ECUs, and do not include functions (MAC generation function, MAC verification function) for processing a MAC.

The gateway 90 is a gateway device that connects multiple different communication links, and forwards data between communication pathways. The gateway 90 is connected to the bus 10, the bus 20, the bus 30, the bus 40, the bus 50, the bus 60, and the bus 70. In other words, the gateway 90 is a type of ECU that includes a function of forwarding a frame (data frame) received from one bus to another bus (namely, a destination bus selected according to a condition) under a fixed condition. The gateway 90 is provided with a communication device (such as a communication circuit) for communicating with the anomaly detection server 80 external to the vehicle. For example, the gateway 90 includes a function of transmitting (uploading) information about the frames received from each bus to the anomaly detection server 80. The configuration of the gateway 90 will be described in detail later.

[1.3 Configuration of Anomaly Detection Server]

Figure 4:
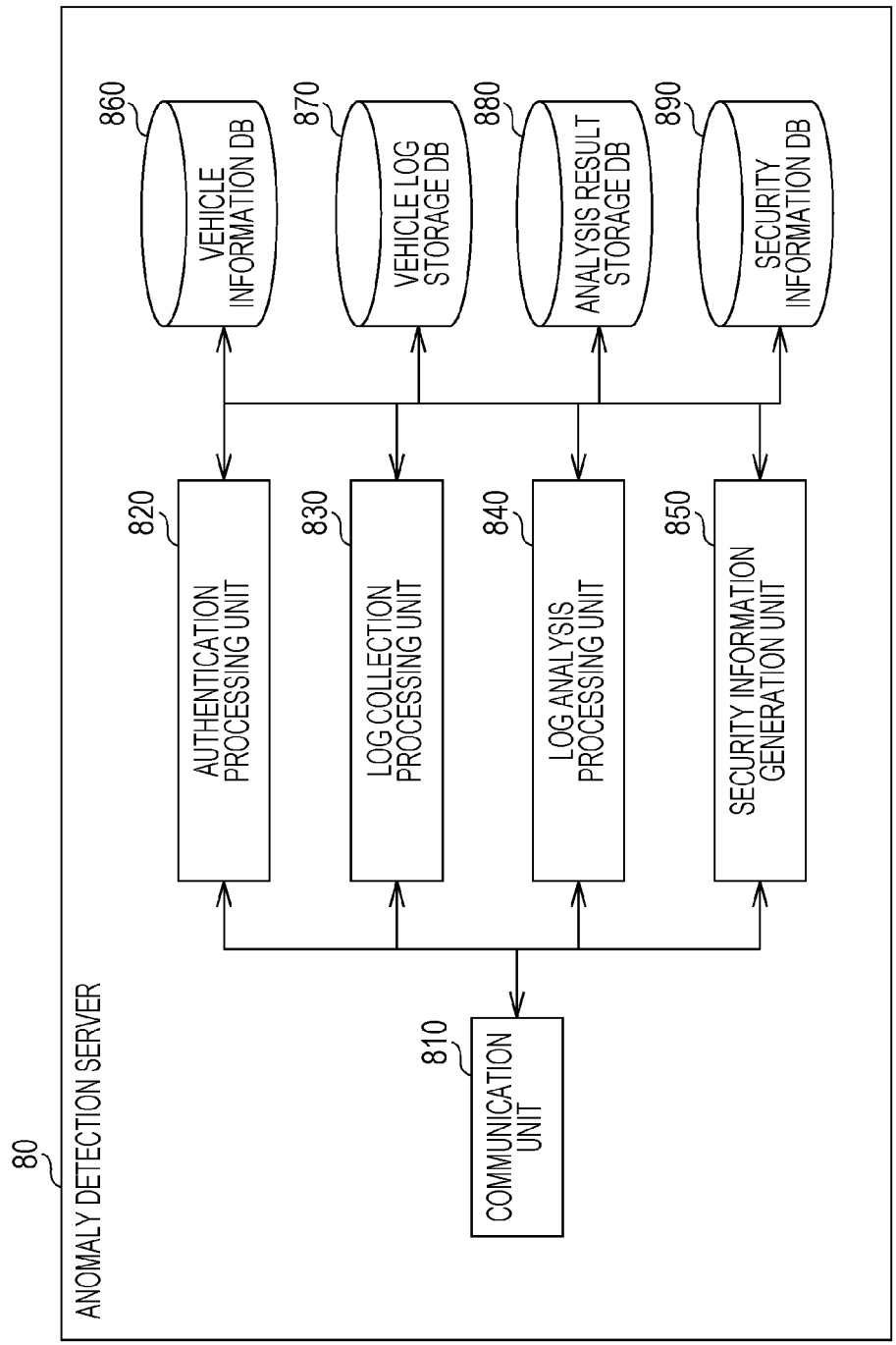
FIG. 4 is a configuration diagram of an anomaly detection server according to Embodiment 1.

FIG. 4 is a configuration diagram of the server (anomaly detection server) 80. The anomaly detection server 80 for counteracting anomalous frames transmitted on the on-board network of the vehicle 1010a and the like is realized by a computer provided with a processor, memory, a communication interface, and the like, for example. The anomaly detection server 80 is configured to include a communication unit 810, an authentication processing unit

820, a log collection processing unit 830, a log analysis processing unit 840, a security information generation unit 850, a vehicle information DB 860, a vehicle log storage DB 870, an analysis result storage DB 880, and a security information DB 890. The vehicle information DB 860, the vehicle log storage DB 870, the analysis result storage DB 880, and the security information DB 890 may be realized by a storage medium or the like, such as memory or a hard disk, for example. Also, the functions of each of the authentication processing unit 820, the log collection processing unit 830, the log analysis processing unit 840, and the security information generation unit 850 may be realized by having a processor execute a control program stored in memory, for example.

The communication unit 810 is realized by a communication interface, a processor that executes a control program stored in memory, and the like. The communication unit 810, by communicating with the vehicles 1010a, 1010b, 1010c, 1010d, 1010e, and 1010f over the network 81, successively receives log information, such as information related to frames (messages) flowing on the CAN bus of each on-board network. The log information includes, for example, information related to the content of frames (messages) received from the CAN bus in the on-board network, and the reception timing (such as the interval and frequency). The communication unit 810 functions as an acquisition unit that acquires by receiving information about frames received on the on-board network of each vehicle. Also, the communication unit 810 transmits security-related transmission information generated by the security information generation unit 850. The transmission information is, for example, presentation information for issuing an alert (warning) notification targeting the occupants or the like of the vehicle, control information indicating control instructions for the running or the like of the vehicle, control information for indicating the update of a key used when applying an encryption process in the vehicle, fraud detection information for detecting frame-related fraudulence on the vehicle side, and the like.

The authentication processing unit 820 is provided with an encryption processing function, and when communicating with the vehicles (the vehicles 1010a, 1010b, 1010c, 1010d, 1010e, and 1010f), the authentication processing unit 820 handles mutual authentication performed between a vehicle and the anomaly detection server 80, and establishes a secure communication link by an encryption process. For example, by the encryption processing function, on the basis of mutual authentication, the authentication processing unit 820 may decrypt encrypted log information from a vehicle received by the communication unit 810, and encrypt transmission information to be transmitted to the vehicle. Also, when encrypting and saving information in various DBs, the anomaly detection server 80 uses the encryption processing function of the authentication processing unit 820.

The log collection processing unit 830 stores various data (such as information about frames received on an on-board network), which is the content of the log information collected from each vehicle, in the vehicle log storage DB 870. When storing the various data in the vehicle log storage DB 870, the log collection processing unit 830 may also perform processing such as a predetermined normalization of the various data. The data (vehicle log information) stored in the vehicle log storage DB 870 will be described later using FIG. 5.

The log analysis processing unit 840 includes a function of analyzing the log information collected from each vehicle and stored (accumulated) in the vehicle log storage DB 870, and thereby assessing the anomaly level, which is an index associated with whether or not a frame received on the on-board network of a certain vehicle is anomalous (whether or not an attack frame has been sent out on the on-board network by an attacker). The log analysis processing unit 840 may perform statistical processing or the like, for example, with respect to information about multiple frames collected from each vehicle (information such as the content of each of the multiple frames, the reception timings, and the like), which is expressed by the collected log information. The log analysis processing unit 840 functions as an assessment unit that, on the basis of information about multiple frames acquired by the communication unit 810 (acquisition unit), and information about a frame received on the on-board network of a single vehicle (for example, the vehicle 1010a) acquired by the acquisition unit after the acquisition with respect to the multiple frames, assesses the anomaly level of the frame received on the on-board network of the single vehicle.

For example, the log analysis processing unit 840 may construct a designated model regarding each frame flowing on the on-board network in a normal state, the designated model being usable for comparison against an anomalous state, and on the basis of the successively acquired log information, use machine learning to adjust (update) the designated model to a more appropriate model. In this case, the log analysis processing unit 840 may perform a treatment process (such as multivariate analysis, for example) as appropriate on the information about multiple frames expressed by the collected log information, and supply the treated information for the learning of the designated model. The learning of the designated model may use either supervised learning or unsupervised learning methods. For example, in the case the on-board network system of each vehicle includes a fraud detection function that detects, on the basis of predetermined rules, a frame (fraudulent frame) that does not conform to the rules flowing on the CAN bus, information indicating a distinction of whether a frame is a fraudulent frame or not a fraudulent frame may be included in the log information, and in the log analysis processing unit 840, supervised learning of the designated model may be performed on the basis of the information indicating the distinction. Also, in the log analysis processing unit 840, log information about frames which are not fraudulent frames from each vehicle may be collected, or log information that does not distinguish whether or not frames are fraudulent frames may be collected, and unsupervised learning of the designated model may be performed on the basis of the log information. The designated model is used to assess the anomaly level (the degree to which a frame is anomalous) of a frame received on the on-board network of a certain vehicle. It is sufficient for the content of the designated model to be usable in such assessment of frame anomaly level. The anomaly level is assessed by a comparison between information about the frame and the designated model (that is, a computational process using the information about the frame and the designated model). As the designated model for assessing anomaly level, for example, the log analysis processing unit 840 may construct a designated model on the basis of the log information for each vehicle of the same vehicle family, to express a distribution of features (such as feature vectors including components such as frame content, reception interval, and reception frequency) regarding the frames received on the on-board network in the normal state. Note that the designated model may be, for example, a model expressing a relationship between an objective variable and an explanatory variable, in which the anomaly level is treated as the objective variable and the log information is treated as the explanatory variable. The anomaly level may be defined so that the non-anomalous (normal) case takes a value of 0 (zero), and the anomalous case takes a positive numerical value in accordance with the degree of anomaly. The anomaly level may also take the binary value of 0 (for example, not anomalous) and 1 (for example, anomalous). The anomaly level may also take three or more values, with the anomalous case being classified into multiple stages. Another possible usage is to determine that a frame is anomalous in the case in which the anomaly level exceeds a predetermined threshold value. As an example, the anomaly level of a frame received on the on-board network of a certain vehicle may be assessed according to whether or not a feature of the frame is positioned inside a range whose boundaries are taken to be threshold values determined by multiplying the standard deviation of a distribution of the feature (for example, a normal distribution specified by the mean and the variance) indicated by a designated model determined on the basis of already-collected log information by a predetermined coefficient (for example, 3). In addition, by using multiple predetermined coefficients, the anomaly level can be assessed in multiple stages. Techniques used in the construction of a designated model for assessing the anomaly level include outlier detection, change-point detection that detects sudden changes on a time series, and the like.

In this way, on the basis of information about multiple frames received on the on-board network of each vehicle expressed by the collected log information (vehicle log information), the log analysis processing unit 840 assesses the anomaly level of a frame received on the on-board network of a certain vehicle after the reception with respect to the multiple frames. Information about the frame received on the on-board network of the certain vehicle may also be acquired from the vehicle log information. Subsequently, the anomaly level assessed by the log analysis processing unit 840 is used to decide the content of the transmission information to be generated by the security information generation unit 850, to decide the range of vehicles set as recipients of the transmission information, to decide the transmission timing (time) of the transmission information, and the like. In the case of determining that a frame received on the on-board network of a certain vehicle is anomalous according to the assessed anomaly level (in other words, in the case of detecting an attack frame), the log analysis processing unit 840 causes the security information generation unit 850 to transmit transmission information (such as a warning notification) to the certain vehicle and to other vehicles under a fixed condition. The log analysis processing unit 840 successively performs various analysis processes, such as statistical processing based on the collected log information, updating (learning) of the designated model, and assessment of the anomaly level of a frame received on the on-board network of a certain vehicle. Subsequently, the log analysis processing unit 840 stores and saves the results of the analysis processes (for example, information expressing the updated designated model, information related to the assessed anomaly level, and the like) in the analysis result storage DB 880 for use in subsequent analysis processes (such as the assessment of the anomaly level of a frame).

The security information generation unit 850 references the vehicle information (see FIG. 6) stored in the vehicle information DB 860 as well as attack phase information (see FIG. 7) and alert level information (see FIG. 8) stored in the security information DB 890, and in accordance with the anomaly level of the frame received on the on-board network of the certain vehicle assessed by the log analysis processing unit 840, decides the content of security-related transmission information, decides the range of vehicles set as recipients of the transmission information (such as whether or not to transmit certain transmission information to vehicles of the same vehicle family), and decides the transmission time of the transmission information. These decisions will be described later using FIGS. 6 to 8. In accordance with these decisions, the security information generation unit 850 controls the transmission of the transmission information, or in other words, causes the communication unit 810 to transmit the transmission information to the vehicles set as recipients.

[1.4 Vehicle Log Information]

Figure 5:
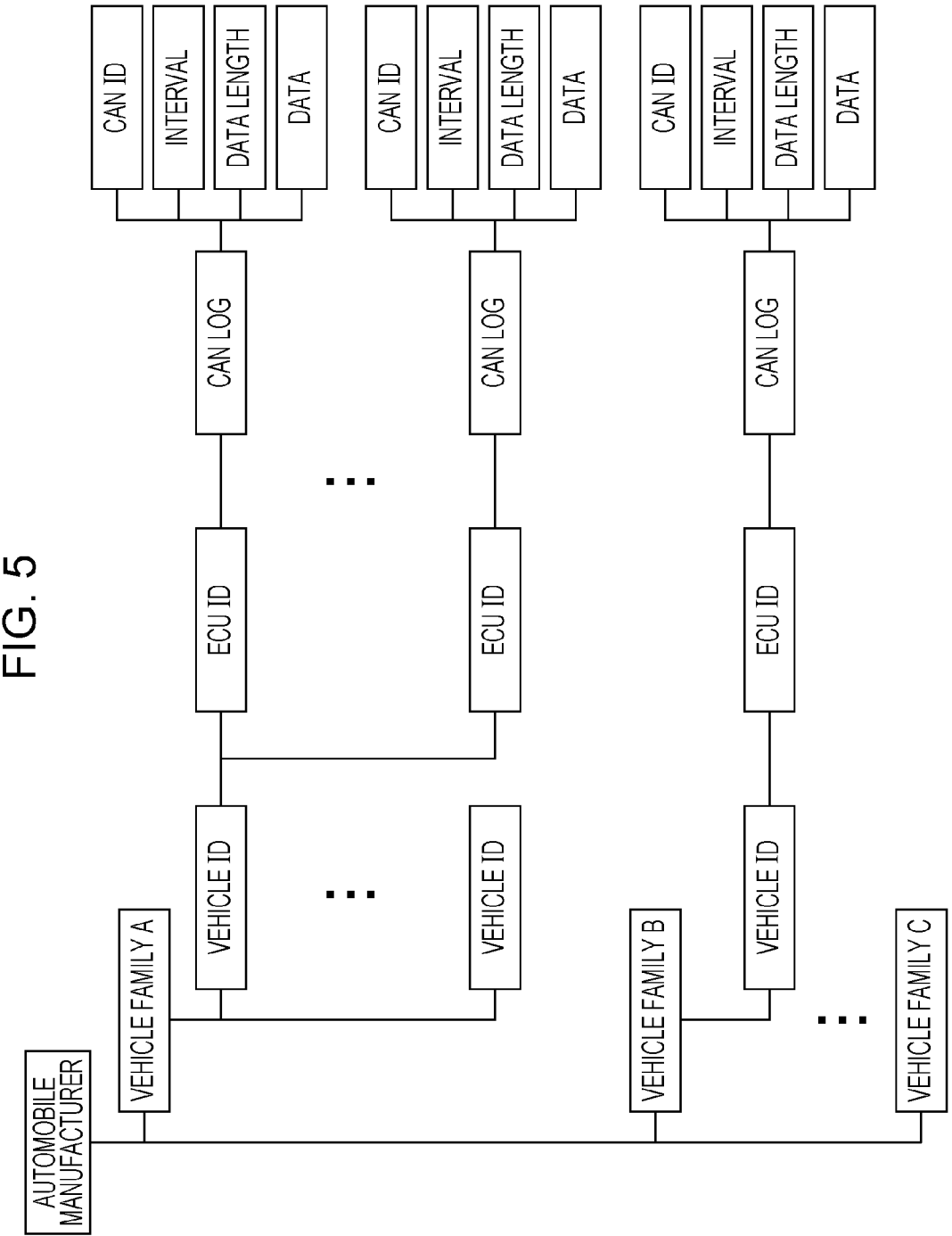
FIG. 5 is a diagram illustrating exemplary content of a vehicle log storage database (DB) of the anomaly detection server according to Embodiment 1.

FIG. 5 is a diagram illustrating an example of vehicle log information which is the content of the vehicle log storage DB in the anomaly detection server 80. As illustrated in the diagram, the vehicle log information is information that expresses, for various vehicles manufactured by automobile manufacturers, a vehicle family, a vehicle ID for identifying the vehicles of each vehicle family, an ID for each ECU installed in the vehicles, and a CAN log, which is information about the frames transmitted by each ECU, in association with each other. The vehicle log information is generated by the anomaly detection server 80 collecting log information acquired from each vehicle. Herein, the CAN log is information based on the content of the log information received from each vehicle, and indicates, for example, CAN frame identification information (an ID (message ID)), the transmission period (reception period) of the frame, the data length indicated by the DLC of the frame, and the data, which is the content in the data field of the frame. Note that each piece of information in the CAN log may also be a normalization of a feature (such as a feature vector, for example) regarding CAN frames indicated by the log information. Note that the vehicle family in the vehicle log information may be specified on the basis of the vehicle ID, for example.

By performing an analysis process based on the vehicle log information, the log analysis processing unit 840 performs assessment of the anomaly level with respect to a frame received on the on-board network of a certain vehicle, and the like.

[1.5 Vehicle Information DB]

FIG. 6 is a diagram illustrating an example of vehicle information stored in the vehicle information DB in the anomaly detection server 80. As illustrated in the diagram, the vehicle information is information that associates, for each vehicle family, the IDs (such as models for identifying the class of ECU) of the ECUs installed in vehicles of that vehicle family, and the IDs (CAN message IDs) of frames transmitted by the ECUs. The vehicle information includes, for each vehicle family, the IDs of all ECUs installed in vehicles of that vehicle family, as well as the CAN message IDs associated with frames transmitted by each of the ECUs, but for the sake of convenience, FIG. 6 only illustrates a portion of the ECU IDs and a portion of the IDs of the frames transmitted by those ECUs.

The example of FIG. 6 illustrates that each vehicle of the vehicle family A is provided with the ECU having the ECU ID "001", which transmits frames having the CAN message ID "100" and frames having the message ID "101", and the ECU having the ECU ID "002", which transmits frames having the CAN message ID "200". Also, each vehicle of the vehicle family B is provided with the ECU having the ECU ID "001", which transmits frames having the CAN message ID "110" and frames having the message ID "111", and the ECU having the ECU ID "003", which transmits frames having the CAN message ID "301". This example illustrates that although the vehicles of the vehicle family A and vehicles of the vehicle family B are provided with an ECU (the ECU with the ID "001") of the same type (identical class), the frames transmitted by each ECU have different CAN message IDs. In this way, ECUs of the same type may be installed in the vehicles of multiple vehicle families. The frames transmitted by respective ECUs of the same type installed in the vehicles of differing vehicle families may only differ in the message ID of the frame, while the other content of the frame (such as the data length indicated by the DLC, and the data in the data field), the transmission period of the frame, and the like are the same.

By referencing this vehicle information, the security information generation unit 850, under a fixed condition corresponding to the anomaly level, is able to include the vehicles of a vehicle family provided with an ECU of the same type as the ECU that transmitted an anomalous frame in a certain vehicle, among the recipients of the security-related transmission information. According to the example in FIG. 6, in the case in which the anomaly level of a frame having the CAN message ID "100" received on the on-board network of a certain vehicle of the vehicle family A indicates an anomalous frame, there is a possibility that the ECU having the ECU ID "001" is being controlled by an attacker. In this case, under a fixed condition, the security information generation unit 850 controls the transmission of certain security-related transmission information to each vehicle of the vehicle family A and the vehicle family B provided with the same type of ECU having the ID "001".

[1.6 Attack Phase Information]

FIG. 7 illustrates an example of attack phase information stored by the security information DB 890. Attack phase information is information in which attacks carried out by attackers transmitting attack frames are classified into multiple stages (herein, four attack phases), and associated with an alert level for each attack phase. In the example of FIG. 7, in the attack phase information, a combination of the attack phase and a number of times an attack of that attack phase has been detected (a detection count) is associated with one of five alert levels. The detection count may be a cumulative detection count, or a detection count over a fixed unit period. The alert level indicates the severity from a security standpoint, and is an index used to classify transmission modes involving the security-related transmission information that the anomaly detection server 80 transmits to vehicles. The transmission modes of transmission information corresponding to each of the alert levels will be described later using FIG. 8.

As illustrated in FIG. 7, attack phases are largely categorized into signs of attack and attacks. Phases 1 to 3 classified into three stages are the attack phases of signs of attack. Also, Phase 4 is the attack phase of attacks. Attack phases are anticipated to be executed basically in the order of Phases 1, 2, 3, 4 by an attacker, but are not necessarily limited to be executed in the order of Phases 1, 2, 3, 4.

Hereinafter, for each attack phase, the anticipated sign of attack or attack by an attacker, an example of an attack phase determination technique, and the alert level will be described.

[1.6.1 Phase 1]

Generally, the specifications related to the CAN frames (messages) used on an on-board network (such as the frame content and use for each message ID, for example) are not disclosed to the public. For this reason, to prepare for an attack, first the attacker illegitimately injects a variety of CAN frames (messages) into a single vehicle through a diagnostic port (for example, the diagnostic port 710 of FIG. 3), and analyzes the specifications related to CAN frames while checking the behavior of the vehicle. This analysis behavior is carried out by repeated trial and error until the specifications related to the CAN frame of a desired attack message are revealed. In addition, in order to insert an attack frame onto the CAN bus separately from the analysis of the specifications related to CAN frames, the attacker searches for a defect (vulnerability) in the on-board network. In the attack phase information, this stage of attack preparation is defined as Phase 1 of a sign of attack.

For example, in the case in which the message ID of a frame assessed to have an anomaly level indicating that the frame is anomalous is a message ID other than a message prescribed to be transmitted by each ECU connected to the on-board network in the normal state of the on-board network, or in the case in which the reception interval (transmission interval) of the frame is different from that of a normal frame, or the like, the security information generation unit 850 may determine Phase 1 of a sign of attack. Also, for example, in the case in which the message ID of a frame assessed to have an anomaly level indicating that the frame is anomalous is the message ID of a diagnostic command, and is an ID that does not correspond to a phase higher (more severe) than Phase 1, the security information generation unit 850 may determine Phase 1 of a sign of attack. Note that a diagnostic command is, for example, a frame that includes a specific message ID (diagnostic message ID) prescribed in advance for use by an authorized diagnostic tool connected to a diagnostic port. Note that any other methods may also be used as a technique for determining Phase 1 of a sign of attack.

The attack phase information associates Phase 1 with an alert level of "1", irrespectively of the detection count. For this reason, in the case of determining Phase 1, the security information generation unit 850 controls the transmission of transmission information to vehicles, in a transmission mode corresponding to an alert level of "1".

[1.6.2 Phase 2]

If a vulnerability is discovered in equipment related to the on-board network or an ECU of a vehicle of a certain specific vehicle family, the attacker attempts to exploit the vulnerability and put the equipment or ECU under the attacker's control, for example. For example, suppose that there is a vulnerability in the head unit (ECU 500), and the head unit is configured to be able to download software such as an application program from an external network. In this case, the attacker publishes malware (such as malicious software that performs unauthorized operations) directed at the head unit, and attempts to get a user to download the malware in order to exploit the vulnerability. Also, the attacker might exploit the vulnerability through external equipment that connects to the head unit. For example, if the head unit is able to connect to a smartphone, the attacker might publish malware for the smartphone on an Internet website or the like, and get a user to download the malware. When the user connects the smartphone to the head unit, the attacker exploits the vulnerability in the head unit from the malware on the smartphone. Subsequently, in order to exploit the vulnerability in the head unit to construct an attack platform for illegitimately accessing the CAN bus, the attacker conceivably may use the malware to illegitimately overwrite software (such as firmware) in the head unit, and put the head unit under the attacker's control. In the attack phase information, this stage of attack preparation is defined as Phase 2 of a sign of attack. Also, if there is a vulnerability in an ECU that directly connects to an external network, such as an ECU (for example, the ECU 302) for V2X (vehicle-to-vehicle communication (V2V) and vehicle-to-infrastructure communication (V2I)), the attacker might take over that ECU and illegitimately overwrite software in the ECU, without going through the head unit or the like. This stage of actions that enable unauthorized access to the CAN bus is also classified as Phase 2 of a sign of attack. In other words, the stage of performing a process that illegitimately overwrites software (such as firmware) in an ECU is treated as Phase 2 of a sign of attack.

For example, in a case such as when the message ID of a frame assessed to have an anomaly level indicating that the frame is anomalous is a message ID prescribed as the ID of a frame for updating the firmware of an ECU, the security information generation unit 850 may determine Phase 2 of a sign of attack. Note that any other methods may also be used as a technique for determining Phase 2 of a sign of attack. For example, a method that checks for the presence of a firmware-updating frame on the CAN bus even though the time is not an appropriate update period may be used.

The attack phase information associates Phase 2 with an alert level of "2" in the case in which the detection count is 1, and associates an alert level of "3" in the case in which the detection count exceeds 1. For this reason, in the case of determining Phase 2, the security information generation unit 850 controls the transmission of transmission information to vehicles, in a transmission mode corresponding to an alert level of "2" if Phase 2 has been detected one time, or in a transmission mode corresponding to an alert level of "3" if Phase 2 has been detected multiple times.

[1.6.3 Phase 3]

After an attack platform has been constructed on the on-board network of a vehicle of a certain specific vehicle family by having malware illegitimately overwrite software or the like in an ECU in Phase 2 of a sign of attack, in order to confirm information about the vehicle family and the like of the vehicle that the malware itself is currently accessing, the malware transmits a diagnostic command or the like on the CAN bus, and attempts to acquire the vehicle ID, ECU information (such as ECU IDs and the names of ECUs), and the like. In the attack phase information, this stage is defined as Phase 3 of a sign of attack.

For example, in the case in which the message ID of a frame assessed to have an anomaly level indicating that the frame is anomalous is the message ID of a diagnostic command for acquiring the vehicle ID, ECU information, and the like, the security information generation unit 850 may determine Phase 3 of a sign of attack. Note that any other methods may also be used as a technique for determining Phase 3 of a sign of attack.

The attack phase information associates Phase 3 with an alert level of "3" in the case in which the detection count is 1, and associates an alert level of "4" in the case in which the detection count exceeds 1. For this reason, in the case of determining Phase 3, the security information generation unit 850 controls the transmission of transmission information to vehicles, in a transmission mode corresponding to an alert level of "3" if Phase 3 has been detected one time, or in a transmission mode corresponding to an alert level of "4" if Phase 3 has been detected multiple times.

[1.6.4 Phase 4]

After the malware has acquired information about the car type and the like in Phase 3 of a sign of attack, the malware accesses an unauthorized server of the attacker, and receives from the unauthorized server a CAN attack set, which indicates a transmission procedure or the like of CAN attack frames corresponding to the relevant vehicle family. The CAN attack set is, for example, prepared by the attacker to indicate the content, transmission sequence, and the like of a group of frames for illegitimately controlling the running and the like of a vehicle with respect to the on-board network of vehicles of each vehicle family. By transmitting attack frames on the CAN bus on the basis of the CAN attack set, the malware carries out an attack, and gains unauthorized control of the vehicle. In the attack phase information, this stage is defined as Phase 4 of an attack.

For example, in the case in which the message ID of a frame assessed to have an anomaly level indicating that the frame is anomalous corresponds to any of multiple message IDs prescribed as the IDs of important control frames in the vehicle that has received the frame, the security information generation unit 850 may determine Phase 4 of an attack. Important control frames may be prescribed arbitrarily in light of severity, and are running-related frames, for example. Running-related frames are frames prescribed to be transmitted by drive-related and chassis-related ECUs (such as the engine ECU, the transmission ECU, the brake ECU, and the steering ECU, for example) associated with control of the running and the behavior of a vehicle, such as "running", "turning", and "stopping", for example. Note that any other methods may also be used as a technique for determining Phase 4 of an attack. For example, a method may be used in which the content of a frame indicating a control instruction for an actuator inside the vehicle is compared to the content of a frame indicating the state of the vehicle reflecting the action of the actuator, to thereby determine whether or not an attack is taking place.

The attack phase information associates Phase 4 with an alert level of "4" in the case in which the detection count is 1, and associates an alert level of "5" in the case in which the detection count exceeds 1. For this reason, in the case of determining Phase 4, the security information generation unit 850 controls the transmission of transmission information to vehicles, in a transmission mode corresponding to an alert level of "4" if Phase 4 has been detected one time, or in a transmission mode corresponding to an alert level of "5" if Phase 4 has been detected multiple times.

[1.7 Alert Level Information]

FIG. 8 illustrates an example of alert level information stored by the security information DB 890. The alert level information is information indicating the transmission mode of transmission information for each alert level. In the example of FIG. 8, the alert level is classified into five stages. Basically, the higher the alert level, the greater the severity. Elements of the transmission mode include the range of vehicles set as recipients, the content of the transmission information, the transmission time of the transmission information, and the like. In the example of FIG. 8, the range of vehicles set as recipients is categorized into three classes (Class A, B, and C). Class A indicates that vehicles in which a sign of attack or an attack is observed (that is, vehicles in which attack frames have been received on the on-board network) are set as recipients. Class B and Class C prescribe vehicles having a certain relationship (vehicles in the same vehicle family or vehicles having the same types of ECUs) with a vehicle in which an attack frame has been received on the on-board network. Class B indicates that vehicles of the same vehicle family as a vehicle in which a sign of attack or an attack is observed are set as recipients. Class C indicates that vehicles of a different vehicle family but having the same type of ECU as the ECU in which a sign of attack or an attack is observed (that is, an ECU that transmits frames having the same ID as an attack frame in the vehicle in which the attack frame has been received on the on-board network) are set as recipients. Also, the example of FIG. 8 illustrates, as the content of the transmission information, an alert (information for warning the occupants or the like of the vehicle, or in other words, information giving an instruction to present a warning), and control information (such as information giving an instruction to switch to predetermined safe running, or information giving an instruction for function degeneracy, like deterring a power steering function, restraining automated driving, and the like). The information giving an instruction to switch to predetermined safe running is, for example, information giving an instruction for low-speed driving (reducing the running speed), information giving an instruction to stop the running of the vehicle (such as coming to a stop on the shoulder), and the like. Also, in the example of FIG. 8, the transmission times of transmission information are classified into immediate notification (immediate transmission), and notification (such as transmission of a notification issued when the engine of the vehicle starts up, or a notification issued once per day, or the like).

The security information generation unit 850, following the transmission mode corresponding to the alert level indicated by the alert level information, decides the content of the transmission information, and controls the transmission of the transmission information. In the example of FIG. 8, an alert level of "5" corresponds to a transmission mode in which an alert and control information for switching the vehicle to a safe state are issued (transmitted) in an immediate notification to Class A vehicles, and an alert is issued in an immediate notification to Class B and C vehicles. An alert level of "4" corresponds to a transmission mode in which an alert and control information for switching the vehicle to a safe state are issued (transmitted) in an immediate notification to Class A vehicles, while Class B and C vehicles are not notified. An alert level of "3" corresponds to a transmission mode in which an alert is issued in an immediate notification to Class A and B vehicles, and an alert is issued in a non-immediate notification to Class C vehicles. An alert level of "2" corresponds to a transmission mode in which an alert is issued in an immediate notification to Class A vehicles only, while Class B and C vehicles are not notified. An alert level of "1" corresponds to a transmission mode in which an alert is issued in a non-immediate notification to Class A vehicles only, while Class B and C vehicles are not notified. Note that the security information generation unit 850 may not only control the transmission of transmission information to vehicles, but also control the transmission of information indicating an alert notification and the like to devices such as the computers of automobile manufacturers and ECU vendors.

In a vehicle receiving transmission information containing an alert described above from the anomaly detection server 80, a warning is presented by a method that causes an occupant of the vehicle, such as the driver, to acknowledge the alert. The presentation of the warning is realized by, for example, displaying a warning mark or a warning message recommending that one go to the automobile dealer on the instrument panel 510, sounding an alarm, turning on a warning light or the like, imparting vibration to the handle (steering wheel) or brake pedal, and the like. Also, in a vehicle receiving transmission information containing control information described above from the anomaly detection server 80, various equipment such as the ECUs inside the vehicle perform operations following the instructions given by the control information. The instructions given by the control information may be an instruction for switching to predetermined safe running, such as low-speed driving or coming to a stop on the shoulder, an instruction for function degeneracy, and the like, as well as any other types of instructions for putting the vehicle into a safe state.

[1.8 Configuration of Gateway]

Figure 9:
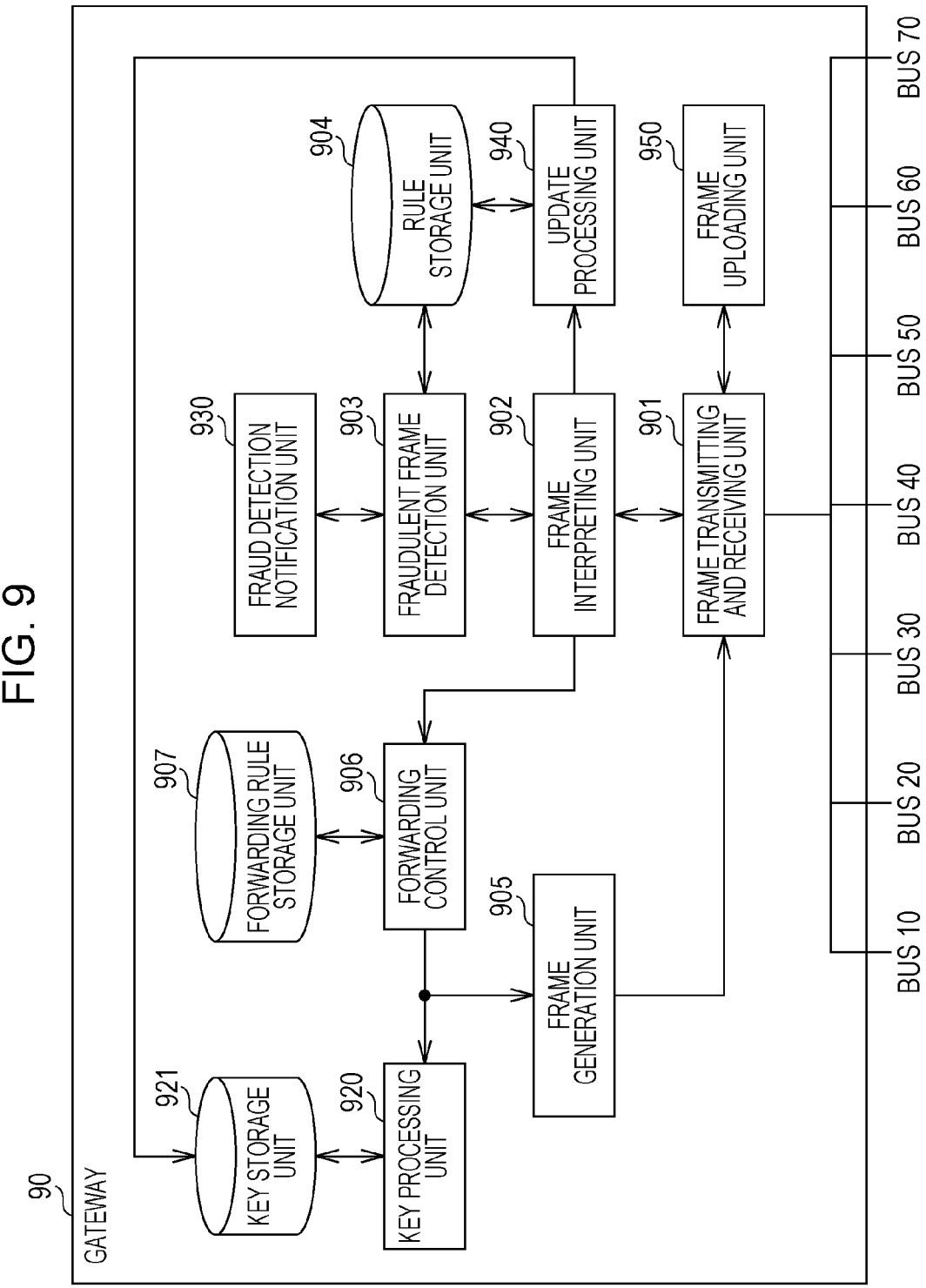
FIG. 9 is a configuration diagram of a gateway on an on-board network according to Embodiment 1.

FIG. 9 illustrates a configuration of the gateway 90 on the on-board network of a certain vehicle (for example, the vehicle 1010*a*). As illustrated in the diagram, the gateway 90 is configured to include a frame transmitting and receiving unit 901, a frame interpreting unit 902, a fraudulent frame detection unit 903, a rule storage unit 904, a frame generation unit 905, a forwarding control unit 906, a forwarding rule storage unit 907, a key processing unit 920, a key storage unit 921, a frame uploading unit 950, a fraud detection notification unit 930, and an update processing unit 940. The respective functions of these structural elements are realized by components in the gateway 90, such as a communication circuit, a processor that executes a control program stored in memory, or a digital circuit, for example. For example, the frame uploading unit 950 and the update processing unit 940 are realized by a communication circuit or the like for communicating with the anomaly detection server 80.

The frame transmitting and receiving unit 901 transmits and receives frames in accordance with the CAN protocol to and from each of the bus 10, the bus 20, the bus 30, the bus 40, the bus 50, the bus 60, and the bus 70. The frame transmitting and receiving unit 901 receives a frame one bit at a time from a bus, and reports to the frame interpreting unit 902. Also, on the basis of bus information indicating the forwarding destination bus and a transmission frame reported by the frame generation unit 905, the frame transmitting and receiving unit 901 transmits the content of the frame one bit at a time to the forwarding destination bus among the bus 10, the bus 20, the bus 30, the bus 40, the bus 50, the bus 60, and the bus 70.

The frame interpreting unit 902 receives the values of a frame from the frame transmitting and receiving unit 901, and conducts interpretation to map the values to each field in the frame format prescribed by the CAN protocol. The frame interpreting unit 902 reports the information in each field of the received frame to the fraudulent frame detection unit 903. Note that, in the case of determining that a received frame does not adhere to the CAN protocol, the frame interpreting unit 902 notifies the frame generation unit 905 to transmit an error frame. Also, if an error frame is received, or in other words, if a received frame is interpreted to be an error frame from a value in the frame, the frame interpreting unit 902 discards the rest of the frame, or in other words, stops interpretation of the frame.

The fraudulent frame detection unit 903 references information (fraud detection information) stored by the rule storage unit 904, the information indicating rules or an algorithm (such as a fraud detection program, for example) for determining whether or not a frame is fraudulent (for detecting a fraudulent frame). The fraudulent frame detection unit 903 determines whether or not a received frame is a fraudulent frame. Examples of the information indicating the rules or algorithm for detecting a fraudulent frame include a whitelist that lists conditions (information for specifying) CAN frames (messages) which are allowed to be received, a blacklist that lists conditions by which frames are not allowed to be received, and the like. A fraudulent frame is a frame that does not conform to the rules for detecting fraudulent frames. In the case of determining a fraudulent frame, while the fraudulent frame is being transmitted, the fraudulent frame detection unit 903 controls the invalidation of the fraudulent frame by transmitting an error frame to the bus on which the fraudulent frame is being transmitted. In other words, in the case of detecting a fraudulent frame, the fraudulent frame detection unit 903 invalidates the fraudulent frame by causing the frame transmitting and receiving unit 901 to transmit an error frame. Also, the fraudulent frame detection unit 903 reports a determination result of whether or not a frame is a fraudulent frame to the frame interpreting unit 902. In the case in which a frame is not determined to be a fraudulent frame by the fraudulent frame detection unit 903, the frame interpreting unit 902 reports the information in each field of the frame to the forwarding control unit 906. Also, in the case of determining a fraudulent frame (in the case of detecting a fraudulent frame), the fraudulent frame detection unit 903 reports information about the fraudulent frame (for example, information indicating fraud detection, or information indicating fraud detection and the content of the fraudulent frame) to the fraud detection notification unit 930. Note that, in the case of determining a fraudulent frame, in order to sufficiently acquire information indicating the content of the fraudulent frame, the fraudulent frame detection unit 903 may rapidly transmit the error frame that invalidates the fraudulent frame after first waiting until a specific part of the fraudulent frame (for example, the data field part) is received.

The forwarding control unit 906, following forwarding rule information stored by the forwarding rule storage unit 907, selects a forwarding destination bus in accordance with the ID (message ID) of a received frame and the forwarding source bus (in other words, the bus that received the frame), reports bus information indicating the forwarding destination bus and the content of the frame to be forwarded (such as the message ID, the DLC (data length), and data (the content of the data field) reported by the frame interpreting unit 902, for example) to the frame generation unit 905, and requests transmission.

The forwarding rule storage unit 907 stores forwarding rule information that indicates rules for forwarding frames for each bus. The forwarding rule information indicates, for each bus that may act as a forwarding source, the message IDs of frames received on that bus which should be forwarded, and the forwarding destination bus. Also, the forwarding rule information includes information indicating whether or not each bus is a bus for which the encryption of frame content is prescribed, and also whether or not each bus is a bus for which the attachment of a MAC to a frame is prescribed (a bus to which a MAC-supporting ECU is connected). By referencing this information, the forwarding control unit 906 performs processes related to each of encryption and MAC attachment when forwarding frames. For example, in the case in which the forwarding destination supports MAC, the forwarding control unit 906 causes the key processing unit 920 to generate a MAC using a MAC key stored by the key storage unit 921, and controls the attachment of the MAC to the frame and the forwarding of the frame. Also, in the case in which the forwarding source supports encryption, the forwarding control unit 906 causes the key processing unit 920 to decrypt the content of the frame using a cryptographic key shared with each ECU connected to the bus of the forwarding source and stored by the key storage unit 921. Additionally, in the case in which the forwarding destination supports encryption, the forwarding control unit 906 controls the forwarding of the frame by causing the key processing unit 920 to encrypt the content of the frame using a cryptographic key shared with each ECU connected to the bus of the forwarding destination and stored by the key storage unit 921. In the key processing unit 920, any type of method may be used for each of the encryption of frame content and the generation of a MAC based on the frame content or the like. For example, the MAC may be generated on the basis of a value in part of the data filed of the frame, or may be generated on the basis of a combination of the value and a value in another field or some other information (such as a counter value that counts the number of times the frame is received, for example). As the MAC calculation method, hash-based message authentication code (HMAC), cipher block chaining message authentication code (CBC-MAC), or the like may be used, for example.

The frame generation unit 905, following the transmission request from the forwarding control unit 906, constructs a transmission frame using the content of the frame reported by the forwarding control unit 906, and reports the transmission frame and bus information (such as an identifier of the bus of the forwarding destination, for example) to the frame transmitting and receiving unit 901.

In the case in which the fraudulent frame detection unit 903 detects a fraudulent frame, in order to notify the driver or the like of the fraud detection, the fraud detection notification unit 930 controls (such as by controlling the frame transmitting and receiving unit 901) a notification of information about the fraudulent frame (for example, information indicating fraud detection, or information indicating fraud detection and the content of the fraudulent frame) to the head unit. Also, in the case in which the fraudulent frame detection unit 903 detects a fraudulent frame, for example, the fraud detection notification unit 930 may also control a notification of log information or the like including information indicating the fraud detection and information about the fraudulent frame to the anomaly detection server 80. The log information that distinguishes fraudulent frames from non-fraudulent frames by the indication of a fraud detection may be used for supervised learning in the anomaly detection server 80, for example. Also, the information indicating fraud detection may also be utilized for various notifications (such as transmission to various transmission destinations, such as automobile manufacturers and ECU vendors, for example) by the anomaly detection server 80.

The update processing unit 940 updates the information indicating the rules or algorithm for detecting fraudulent frames (such as a whitelist and a blacklist) stored by the rule storage unit 904, on the basis of information acquired from the anomaly detection server 80.

The frame uploading unit 950 successively acquires frames received from one of the CAN buses by the frame transmitting and receiving unit 901, and transmits (uploads) log information including information about the received frames (such as the frame content, reception interval, and reception frequency, for example) to the anomaly detection server 80. The frame uploading unit 950 includes the identification information (vehicle ID) of the vehicle provided with the gateway 90 in the log information. Additionally, the frame uploading unit 950 may also include various other information (such as vehicle status information and information about the position of the vehicle, for example) in the log information. With regard to the information about received frames, in order to make the information easy to handle in the case of performing statistical processing, machine learning, and the like on the anomaly detection server 80, the frame uploading unit 950 may also perform a treatment process on the frame content, the reception interval, the reception frequency, and the like. Herein, the reception interval of a frame is the difference between the reception time of a frame, and the time at which a frame of the same ID was received previously, for example. Also, the reception frequency of a frame is the number of times a frame of the same ID is received over a fixed unit time, for example. The treatment process is a process that involves the restructuring of frame-related data and data analysis (such as multivariate analysis, including principal component analysis and the like), for example. For example, the treatment process extracts feature values from features such as the frame content, the reception interval, and the reception frequency, performs normalization or the like, condenses the amount of information in the feature values, and the like. The condensation of the amount of information in the feature values is realized by, for example, expressing the information as a feature vector in which the feature values are taken as each component, and on the basis of information obtained in conjunction with the anomaly detection server 80, reducing the dimensionality of the feature vector by principal component analysis. Additionally, every time the frame transmitting and receiving unit 901 receives a frame from the CAN bus, the frame uploading unit 950 may transmit log information including information about the frame to the anomaly detection server 80, or at a stage when multiple frames have been received, the frame uploading unit 950 may transmit log information including information about each frame to the anomaly detection server 80. However, if information about a frame received from the CAN bus is rapidly transmitted to the anomaly detection server 80, the anomaly detection server 80 may rapidly detect whether or not the frame is anomalous, making rapid counteraction possible. In addition, in order to reduce the amount of traffic with the anomaly detection server 80, for example, the frame uploading unit 950 may compress the log information for transmission to the anomaly detection server 80, either unconditionally or in accordance with communication conditions. Alternatively, the frame uploading unit 950 may not include information about all frames received from the CAN bus by the frame transmitting and receiving unit 901 in the log information, but instead include information about only the frames of a specific ID or IDs in the log information.

Note that, to support the case in which transmission information is transmitted from the anomaly detection server 80, the gateway 90 receives the transmission information, and in accordance with the transmission information (such as an alert and control information), the presentation of a warning, the control of the running of the vehicle, the control of function degeneracy, and the like are realized by transmitting required information to predetermined ECUs over the CAN bus and the like.

[1.9 Cooperative Operations Between Anomaly Detection Server and Vehicle]

Figure 10:
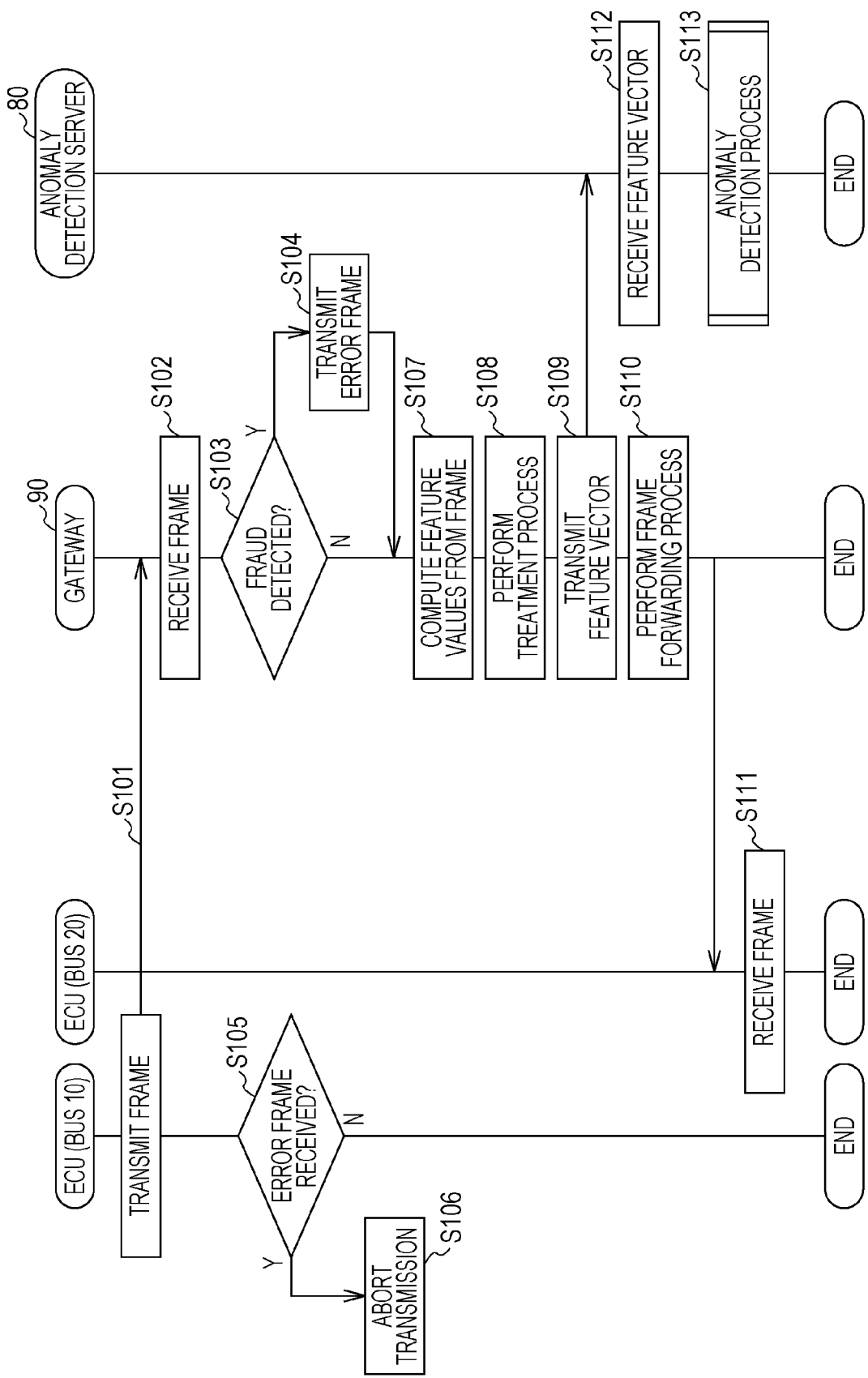
FIG. 10 is a sequence diagram illustrating an example of cooperative operations between the anomaly detection server and a vehicle according to Embodiment 1.

FIG. 10 is a sequence diagram illustrating an example of cooperative operations between the anomaly detection server 80 and a vehicle. The diagram primarily illustrates exemplary operations in which a certain vehicle (the vehicle 1010a) transmits log information including information about frames received on the CAN bus of the on-board network (a feature vector obtained by performing a treatment process on the frame information) to the anomaly detection server 80, and in the anomaly detection server 80, processes such as an assessment of the anomaly level of a frame (anomaly detection process) are performed. Specifically, exemplary operations when the gateway 90 of a certain vehicle receives a single frame are illustrated. In this example, an example of the vehicle 1010a transmitting log information to the anomaly detection server 80 is illustrated, but each other vehicle (such as the vehicles 1010b, 1010c, 1010d, 1010e, and 1010f) similarly transmits log information to the anomaly detection server 80. Hereinafter, exemplary operations will be described following FIG. 10.

One ECU (such as the engine ECU 100 or the transmission ECU 101, for example) connected to the bus 10 in the on-board network of the vehicle 1010a starts to transmit a CAN frame on the bus 10 (step S101).

The gateway 90 of the vehicle 1010a receives the frame transmitted in step S101 from the bus 10 (step S102).

In the gateway 90, while the frame is being transmitted in step S101, the fraudulent frame detection unit 903 determines whether or not the frame received in step S102 is fraudulent, by referencing information indicating rules or an algorithm for detecting a fraudulent frame (step S103). In step S103, in the case of determining fraud (in the case of fraud detection), the gateway 90 transmits an error frame to invalidate the fraudulent frame before the transmission of the frame which began to be transmitted in step S101 is completed (step S104). Note that, by the transmission of the error frame, the error frame is received in the ECU which is connected to the bus 10 and which is currently transmitting the fraudulent frame (step S105). Upon receiving the error frame, the ECU aborts the transmission of the frame (step S106). Also, other ECUs connected to the bus 10 receive the error frame, and thereby stop receiving the frame that began to be transmitted in step S101.

In the case of not determining fraud in step S103, or after the transmission of the error frame in step S104, the gateway 90 specifies (computes) feature values on the basis of the content, the reception interval, the reception frequency, and the like or the frame received in step S102 (step S107).

Next, in the gateway 90, the frame uploading unit 950 performs a treatment process on the basis of the feature values for the frame computed in step S107 (step S108). As a result of the treatment process, the frame uploading unit 950 transmits log information including the feature vector for the frame to the anomaly detection server 80 (step S109).

Also, in the gateway 90, the forwarding control unit 906 performs a frame forwarding process (a process of forwarding the frame on the basis of the forwarding rule information), except in the case in which the received frame is determined to be fraudulent in step S103 (step S110). In the example of FIG. 10, by the frame forwarding process, the gateway 90 forwards the frame to the bus 20, and the brake ECU 200 or the steering ECU 201 connected to the bus 20 receives the forwarded frame (step S111).

The anomaly detection server 80 receives, from the gateway 90, log information including a feature vector for the frame received on the on-board network of the vehicle 1010a (step S112). Subsequently, the anomaly detection server 80 utilizes the received log information including the feature vector to perform the anomaly detection process (step S113). Next, the anomaly detection process will be described using FIG. 11.

[1.10 Anomaly Detection Process in Anomaly Detection Server]

Figures 11, 12A:
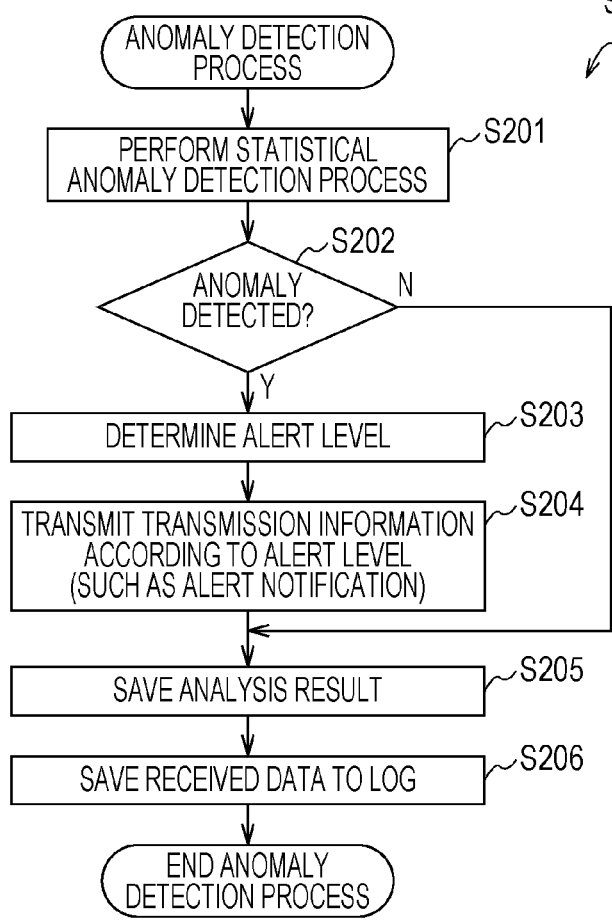
FIG. 11 is a flowchart illustrating an example of an anomaly detection process in the anomaly detection server according to Embodiment 1.
FIG. 12A is a diagram illustrating Example 1 of alert level deciding information in Embodiment 1.

FIG. 11 is a flowchart illustrating an example of the anomaly detection process in the anomaly detection server 80. Hereinafter, the anomaly detection process will be described by following the diagram.

The anomaly detection server 80 performs a statistical anomaly detection process on the basis of log information (log information including information about frames received on the on-board network of each vehicle) transmitted from each vehicle (step S201). The statistical anomaly detection process includes a process of referencing the log information acquired from each vehicle (that is, each set of log information collected as vehicle log information) to perform statistical processing, multivariate analysis, and the like on the basis of the information about frames received on the on-board network, and thereby constructing a designated model that may be used for comparison with an anomalous state, or updating the designated model by machine learning. In addition, the statistical anomaly detection process includes a process of performing computational processing (such as comparison) using the designated model based on frames received on the on-board network of each vehicle in the past, and information (such as a feature vector) about a frame received on the on-board network of a certain vehicle (herein taken to be the vehicle 1010a) included in the latest log information acquired from the vehicle, and thereby assessing the anomaly level of the frame received in the vehicle 1010a. The computational processing may include, for example, processing for outlier detection, change-point detection that detects sudden changes on a time series, and the like. In the anomaly detection server 80, the anomaly level of a frame is assessed by the log analysis processing unit 840 described above. Note that the frame whose anomaly level is assessed by the anomaly detection server 80 is not limited to a frame received on the on-board network of the vehicle 1010a, and may also be a frame received on the on-board network of another vehicle.

The anomaly detection server 80 determines whether or not the anomaly level assessed for the frame by the statistical anomaly detection process in step S201 is higher than a predetermined threshold value, and thereby determines whether or not the frame is anomalous (anomaly detection) (step S202).

In the case of determining that the frame is anomalous in step S202, the anomaly detection server 80 determines which stage of attack phase, such as a sign of attack or an attack, for example, the frame corresponds to, in accordance with the identification information (message ID) and the like of the frame determined to be anomalous, and uses the attack phase information (see FIG. 7) to decide an alert level (in other words, to decide the transmission mode, such as the content of the transmission information, the transmission time, and the range of vehicles set as recipients) (step S203).

Next, the anomaly detection server 80 transmits the transmission information (such as an alert and control information) in the transmission mode according to the alert level decided in step S203 (step S204). With this arrangement, in accordance with the alert level information (see FIG. 8), transmission information for an alert notification, running control, and the like is transmitted to one or multiple vehicles.

After step S204, or in the case of determining in step S202 that the frame is not anomalous, the anomaly detection server 80 stores and saves the determination result in step S202, or information expressing the designated model after being updated by the statistical anomaly detection process in step S201, in the analysis result storage DB 880 (step S205). In addition, the anomaly detection server 80 includes and saves the latest data (log information) received from the vehicle 1010a in the vehicle log information (step S206). Note that the updating of the designated model by machine learning in the anomaly detection server 80 may also be executed not as part of the statistical anomaly detection process of step S201, but instead in step S206, for example.

[1.11 Modification of Alert Level Decision Method]

For a frame received on the on-board network of the vehicle 1010a or the like, in the case in which the assessed anomaly level indicates that the frame is anomalous, the anomaly detection server 80 references attack phase information as illustrated in FIG. 7 to decide the alert level. Instead of the method of deciding the alert level by using the attack phase information to determine the attack phase on the basis of the message ID or the like of the frame described above, the anomaly detection server 80 may also use an alert level decision method that follows alert level decision information as indicated below.

FIG. 12A illustrates Example 1 of alert level decision information. In this example, a cumulative number of vehicles (cumulative vehicle count) for which the anomaly level assessed by the anomaly detection server 80 for a frame received on the on-board network of the vehicle indicates that the frame is anomalous is treated as a base of reference, and the alert level is varied in accordance with the cumulative vehicle count. As the cumulative vehicle count increases, the alert level rises. The anomaly detection server 80 may assess the cumulative vehicle count for each vehicle of the same vehicle family, for example.

FIG. 12B illustrates Example 2 of alert level decision information. In this example, a number per unit time (such as several dozen hours, for example) of vehicles (detected vehicle count) for which the anomaly level assessed by the anomaly detection server 80 for a frame received on the on-board network of the vehicle indicates that the frame is anomalous is treated as a base of reference, and the alert level is varied in accordance with the detected vehicle count. As the detected vehicle count per unit time increases, the alert level rises. In this way, by distinguishing the detected vehicle count per unit time, it becomes possible to raise the alert level and take action in the case in which attacks suddenly increase. The anomaly detection server 80 may assess the detected vehicle count for each vehicle of the same vehicle family, for example.

FIG. 12C illustrates Example 3 of alert level decision information. In this example, the position and distance (such as a minimum distance, a maximum distance, and an average distance, for example) of vehicles of the same vehicle family for which the anomaly level assessed by the anomaly detection server 80 for a frame received on the on-board network of the vehicle indicates that the frame is anomalous are treated as a base of reference, and the alert level is varied in accordance with the distance. Note that besides treating the distance between a vehicle in which a frame-related anomaly has occurred and one or more vehicles of the same vehicle family in which the same anomaly has occurred as the base of reference, the alert level may also be varied by treating a minimum value, a maximum value, or an average value of the relative distances among all of these vehicles or the like as the base of reference. As the distance shortens, the alert level rises. In this way, by distinguishing the distance of vehicles in which an anomaly has occurred, it becomes possible to raise the alert level and take action in the case in which attacks are occurring locally. Note that in order to decide the alert level, instead of using the distances between vehicles with anomalies as in Example 3, the density of a vehicle group with anomalies may also be used.

FIG. 12D illustrates Example 4 of alert level decision information. In this example, identification information (a CAN message ID) of a frame for which the anomaly level assessed by the anomaly detection server 80 for the frame received on the on-board network of the vehicle indicates that the frame is anomalous is treated as a base of reference, and the alert level is varied in accordance with the message ID. Message IDs are prescribed for each alert level in advance as the alert level decision information. For example, it is useful to associate a higher alert level with the message IDs of frames containing data having a greater influence on the running of the vehicle.

The method of deciding an alert level corresponding to the various transmission modes of transmitting transmission information from the anomaly detection server 80 is not limited to the above-described, and any type of base of reference may be used. For example, as the alert level decision method, several of the bases of reference used in Example 1 to Example 4 of the alert level decision information may be combined and used.

Figures 12E, 13:
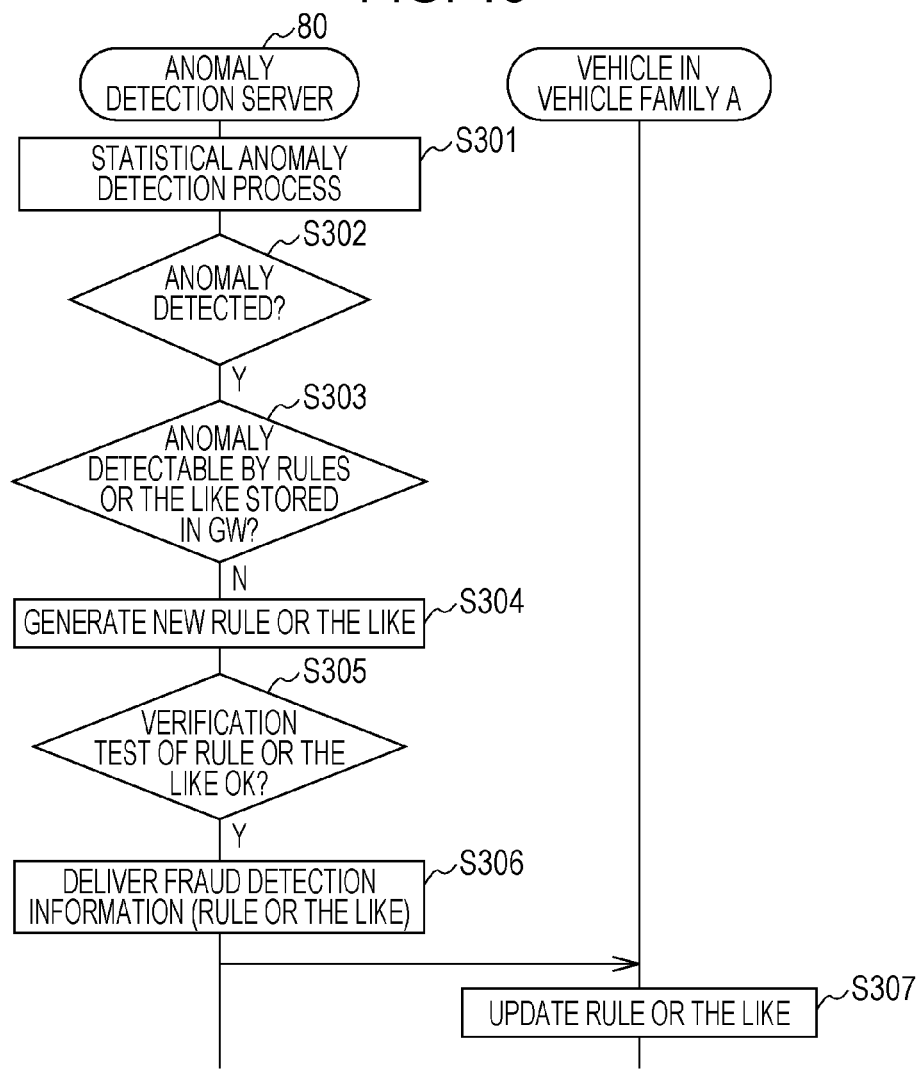
FIG. 12E is a diagram illustrating Example 5 of alert level deciding information in Embodiment 1.
FIG. 13 is a sequence diagram illustrating exemplary operations of the delivery of fraud detection information (such as rules) by the anomaly detection server according to Embodiment 2.

Besides each of the decision methods described above that decide an alert level in accordance with the anomaly level of a frame assessed by the anomaly detection server 80 using some kind of base of reference in the case in which the anomaly level indicates that the frame is anomalous, an alert level may also be decided directly in accordance with the anomaly level of the frame. FIG. 12E illustrates Example 5 of alert level decision information for deciding an alert level directly in accordance with the anomaly level of a frame. In this example, the anomaly level assessed by the anomaly detection server 80 for a frame received on the on-board network of the vehicle is treated as a base of reference, and the alert level is varied in accordance with the anomaly level. As the anomaly level rises, the alert level rises. Note that in Example 5, the anomaly level is expressed as an integer value, but the anomaly level may be expressed by any form of representation. In addition, the anomaly level may be categorized into multiple stages, with each of the categories corresponding to each of the attack phases described above, and the alert level may be decided on the basis of the attack phase information (see FIG. 7). Note that the transmission mode specified by the alert level (such as the content of the transmission information, the transmission time, and the range of recipients) may contain any type of content. For example, the content of the transmission information may be the same as or different from the transmission information transmitted with regard to a vehicle in which an anomalous frame has been detected, and the transmission information (certain transmission information) transmitted to vehicles having a certain relationship with such a vehicle.

[1.12 Advantageous Effects of Embodiment 1]

In the on-board network management system according to Embodiment 1, the anomaly detection server 80 executes a security processing method that collects information and the like about frames received on the on-board network from each vehicle to adjust a designated model by machine learning and the like, and assesses the anomaly level for a frame received on a certain on-board network by computational processing involving a comparison between information about the frame and the designated model. For example, the designated model may reflect a distribution of features, such as the kind of timings and the kind of included content in frames flowing on the on-board network of each vehicle in a basically normal state. For this reason, anomalies that go undetected by fraud detection techniques based on existing rules such as a blacklist (for example, attack frames related to a sign of attack, a hitherto unknown attack, and the like) may be detected by the anomaly detection server 80. In the anomaly detection server 80, by performing a statistical anomaly detection process, among the frames which are not normal, that is, among the anomalous frames, a frame which is not a frame that does not conform to existing rules (fraudulent frame) may also be detected. In this way, the security of the on-board network in each vehicle may be raised by the anomaly detection server 80.

Also, the anomaly detection server 80 decides an alert level in accordance with the assessed anomaly level, either directly or in conjunction with another base of reference, and transmits security-related transmission information (such as an alert notification) to one or multiple vehicles in a transmission mode corresponding to the alert level. With this arrangement, encouraging the driver or the like of a vehicle to pay attention to the anomaly, or controlling the vehicle to switch to a safer state, and the like may be realized. With the anomaly detection server 80, by varying the alert level in accordance with the attack phase or the like, for example, appropriate security countermeasures may be realized in accordance with the degree, scale, or the like of a sign of attack, an attack, or the like. The anomaly detection server 80, under a fixed condition, transmits an alert notification and the like not only to the vehicle in which a sign of attack or an attack is detected, but also to vehicles in the same vehicle family as the vehicle, or vehicles of a different vehicle family provided with an ECU of the same type as the ECU under attack. For this reason, it becomes possible to minimize the influence of the current attack and subsequent attacks.

Additionally, the anomaly detection server 80 is capable of detecting anomalies in multiple vehicles, and thus is useful for detecting and counteracting a rash of attacks occurring at the same time. The anomaly detection server 80 transmit an alert notification to the drivers of vehicles, automobile manufacturers, ECU vendors, and the like under a fixed condition, thereby making it possible to take appropriate counteraction against an attack (such as taking counteraction for preemptively stopping the attack, for example).

As described above, the anomaly detection server 80 includes a function of assessing the anomaly level of a frame on the basis of information about the frame, and the like. Accordingly, in the case in which a frame received on an on-board network is in a gray zone where it is difficult to determine whether or not the frame is an attack frame, a vehicle may inform the anomaly detection server 80 of information about the frame, and request assessment of the anomaly level, or request anomaly detection such as determining whether or not the frame is anomalous based on the anomaly level. In this case, by receiving an anomaly detection result, the vehicle becomes able to take appropriate action with respect to a gray zone frame.

As another example, it is also possible to utilize on-board log information collected by the anomaly detection server 80 (each set of log information collected from each vehicle) for analysis after an incident has occurred (drive recorder analysis) in the Automotive Information Sharing and Analysis Center (Auto-ISAC), which is a security information sharing organization that conducts information sharing, analysis, and countermeasure study regarding cyberattack threats and vulnerabilities with respect to automobiles, or a similar security organization.

Embodiment 2

In Embodiment 1, in the case in which the anomaly detection server 80 detects that a frame received on the on-board network of a certain vehicle is anomalous, the content of the transmission information to transmit to the vehicle is described mainly as an alert notification and control information that indicates control instructions for the running of the vehicle and the like. The present embodiment describes an example in which the content of the transmission information is fraud detection information for detecting frame-related fraud on the vehicle side. The configuration of the on-board network management system illustrated in the present embodiment is similar to the one illustrated in Embodiment 1 (see FIG. 2).

[2.1 Anomaly Detection Server that Delivers Fraud Detection Information]

With regard to points not particularly indicated herein, the anomaly detection server 80 is provided with the configuration illustrated in Embodiment 1 (see FIG. 4).

The anomaly detection server 80 assesses the anomaly level of a frame received on the on-board network of a certain vehicle, on the basis of information about the frame. In the case in which the anomaly level of the frame indicates that the frame is anomalous, the anomaly detection server 80 transmits (delivers) transmission information including fraud detection information that indicates rules or an algorithm for detecting the same anomaly as the anomaly on an on-board network to the vehicle as well as vehicles in the same vehicle family as the vehicle. Note that the anomaly detection server 80 manages management information (such as a version number of the fraud detection information, for example) identifying the content of the fraud detection information that indicates rules or an algorithm for determining whether or not a frame is a fraudulent frame (for detecting a fraudulent frame) stored by the rule storage unit 904 of the gateway 90 for each vehicle family.

[2.2 Exemplary Operations of Delivery of Fraud Detection Information]

FIG. 13 is a sequence diagram illustrating exemplary operations of the delivery of fraud detection information (such as rules) by the anomaly detection server 80.

The anomaly detection server 80 performs a statistical anomaly detection process on the basis of log information transmitted from each vehicle (step S301). The statistical anomaly detection process in step S301 is similar to the process in step S201 illustrated in Embodiment 1. Herein, an example of detecting an attack frame in the vehicle 1010a of vehicle family A. In step S301, by performing computational processing (such as comparison) using the designated model based on frames received on the on-board network of each vehicle in the past, and information (such as a feature vector) about a frame received on the on-board network of the vehicle 1010a included in the log information acquired from the vehicle, the anomaly level of the frame received in the vehicle 1010a is assessed.

The anomaly detection server 80 determines whether or not the anomaly level assessed for the frame received on the on-board network of the vehicle 1010a by the statistical anomaly detection process in step S301 is higher than a predetermined threshold value, and thereby determines whether or not the frame is anomalous (anomaly detection) (step S302).

In the case of determining that the frame is anomalous (in other words, an attack frame) in step S302, the anomaly detection server 80 confirms, on the basis of management information for the fraud detection information or the like, whether or not the anomalous attack frame is detectable by the rules or algorithm indicated by the fraud detection information stored by the rule storage unit 904 of the gateway 90 of the vehicle 1010a (step S303).

In step S303, in the case of confirming that the anomaly (attack frame) is not detectable by the rules or algorithm indicated by the fraud detection information stored by the rule storage unit 904 of the gateway 90, the anomaly detection server 80 generates a new rule or algorithm for detecting the anomalous attack frame (step S304). Note that, when generating a new rule or the like in step S304, the anomaly detection server 80 may also perform the generation by receiving an instruction from an operator or the like through a user interface. In the case of determining that the frame is not anomalous in step S302, or in the case of confirming that the anomalous attack frame is detectable by the rules or the like stored in the vehicle in step S303, the fraud detection information is not delivered.

The anomaly detection server 80 performs a verification test regarding whether or not a problem has occurred in using the generated new rule or algorithm for detecting the attack frame in the vehicle, and only in the case in which the verification test is successful (step S305), the anomaly detection server 80 delivers transmission information including fraud detection information indicating the rule or algorithm to vehicles in the vehicle family A that includes the vehicle 1010a (step S306). Note that the verification test is performed in an environment that simulates a vehicle, for example. Also, in the case in which the verification test is not successful, the new rule or algorithm may be adjusted or the like to make the verification test successful, and then fraud detection information indicating the adjusted rule or algorithm may be delivered.

In the gateway 90 of a vehicle receiving the delivery of the fraud detection information (that is, a vehicle receiving transmission information including the fraud detection information), the update processing unit 940 updates the fraud detection information indicating rules or an algorithm for fraud detection stored by the rule storage unit 904, on the basis of the fraud detection information acquired from the anomaly detection server 80 (step S307).

[2.3 Advantageous Effects of Embodiment 2]

In the on-board network management system according to Embodiment 2, in the case of determining that a frame received on the on-board network of a certain vehicle is anomalous (an attack frame) according to an anomaly level assessed for the frame by the anomaly detection server 80, under a fixed condition, fraud detection information indicating a rule or algorithm for detecting the anomaly (the attack frame) on the vehicle side is delivered to vehicles in the same vehicle family as the vehicle.

With this arrangement, in the case in which a similar attack frame is transmitted, it becomes possible for a device inside the vehicle (for example, the gateway 90) to use the fraud detection information to detect the attack frame as a fraudulent frame that does not conform to the rules. Consequently, the security of the on-board network in each vehicle may be raised.

Embodiment 3

The present embodiment describes an example in which, to support the detection of an anomaly in a frame whose data is prescribed to be protected by having the anomaly detection server 80 apply cryptographic processing technology (encryption or MAC attachment) to transmit the data, the anomaly detection server 80 transmits a key update request (transmission information including control information for giving an instruction to update a key used in the application of cryptographic processing technology in a vehicle) to a vehicle. The configuration of the on-board network management system illustrated in the present embodiment is similar to the one illustrated in Embodiment 1 (see FIG. 2).

[3.1 Configuration of Anomaly Detection Server]

With regard to points not particularly indicated herein, the anomaly detection server 80 is provided with the configuration illustrated in Embodiment 1 (see FIG. 4).

The anomaly detection server 80 assesses the anomaly level of a frame received on the on-board network of a certain vehicle, on the basis of information about the frame. In the case in which the anomaly level of the frame indicates that the frame is anomalous, when a fixed condition is satisfied, the anomaly detection server 80 transmits a key update request to the vehicle (the vehicle in which the anomalous frame is detected) and to vehicles having a certain relationship with the vehicle. Vehicles having a certain relationship with the vehicle in which the anomalous frame is detected are, for example, vehicles in the same vehicle family, vehicles provided with the same type of ECU, or the like. If the vehicles having the certain relationship are specifiable on the basis of information related to the vehicle in which the anomalous frame is detected, the vehicles may also have some other fixed relationship. Also, the fixed condition described above is a condition for estimating that a cryptographic key (for example, an encryption key) or a MAC key has leaked, and is satisfied when, for example, the anomalous frame is a key-related message (that is, when the frame is a frame for which encryption of the frame content is prescribed, or a frame for which the attachment of a MAC to the frame is prescribed). Additionally, a condition such as that the running state of the vehicle or the like is anomalous (a condition for more accurately estimating that a cryptographic key or a MAC key has leaked) may also be added to the fixed condition. The anomaly detection server 80 may also determine whether or not the leak of a cryptographic key or a MAC key may be estimated, according to computational processing using log information acquired from a vehicle and a designated model.

In order to detect an anomaly in a frame protected by encryption or a MAC, the anomaly detection server 80 uses a predetermined MAC/encryption-protected message ID list. FIG. 14 is a diagram illustrating an example of the MAC/encryption-protected message ID list. As illustrated in FIG. 14, the MAC/encryption-protected message ID list is information that associates, for each vehicle family, the IDs of ECUs provided in vehicles of the vehicle family (such as model numbers for identifying the classes of ECUS), the IDs (CAN message IDs) of frames transmitted by the ECUs, whether or not frames of the message IDs support MAC (are protected by a MAC), and whether or not frames of the message IDs support encryption (are protected by encryption). The MAC/encryption-protected message ID list includes, for each vehicle family, the IDs of all ECUs installed in vehicles of that vehicle family, as well as the CAN message IDs associated with frames transmitted by each of the ECUs, but for the sake of convenience, FIG. 14 only illustrates a portion of the ECU IDs and a portion of the IDs of the frames transmitted by those ECUS. With the MAC/encryption-protected message ID list, identification information (a message ID) prescribed in advance for a frame use to transmit data by applying cryptographic processing technology may be specified.

The example of the MAC/encryption-protected message ID list in FIG. 14 illustrates that a frame with the CAN message ID "100" transmitted by the ECU with the ID "001" provided in each vehicle of vehicle family A is protected by a MAC, and is not protected by encryption. Also illustrated is that a frame with the CAN message ID "101" transmitted by the ECU is not protected by a MAC, and is protected by encryption. Also illustrated is that a frame with the CAN message ID "111" transmitted by the ECU with the ID "001" provided in each vehicle of vehicle family B is protected by both a MAC and encryption.

[3.2 Exemplary Operations of Key Update Request According to Anomaly Detection]

Figure 15:
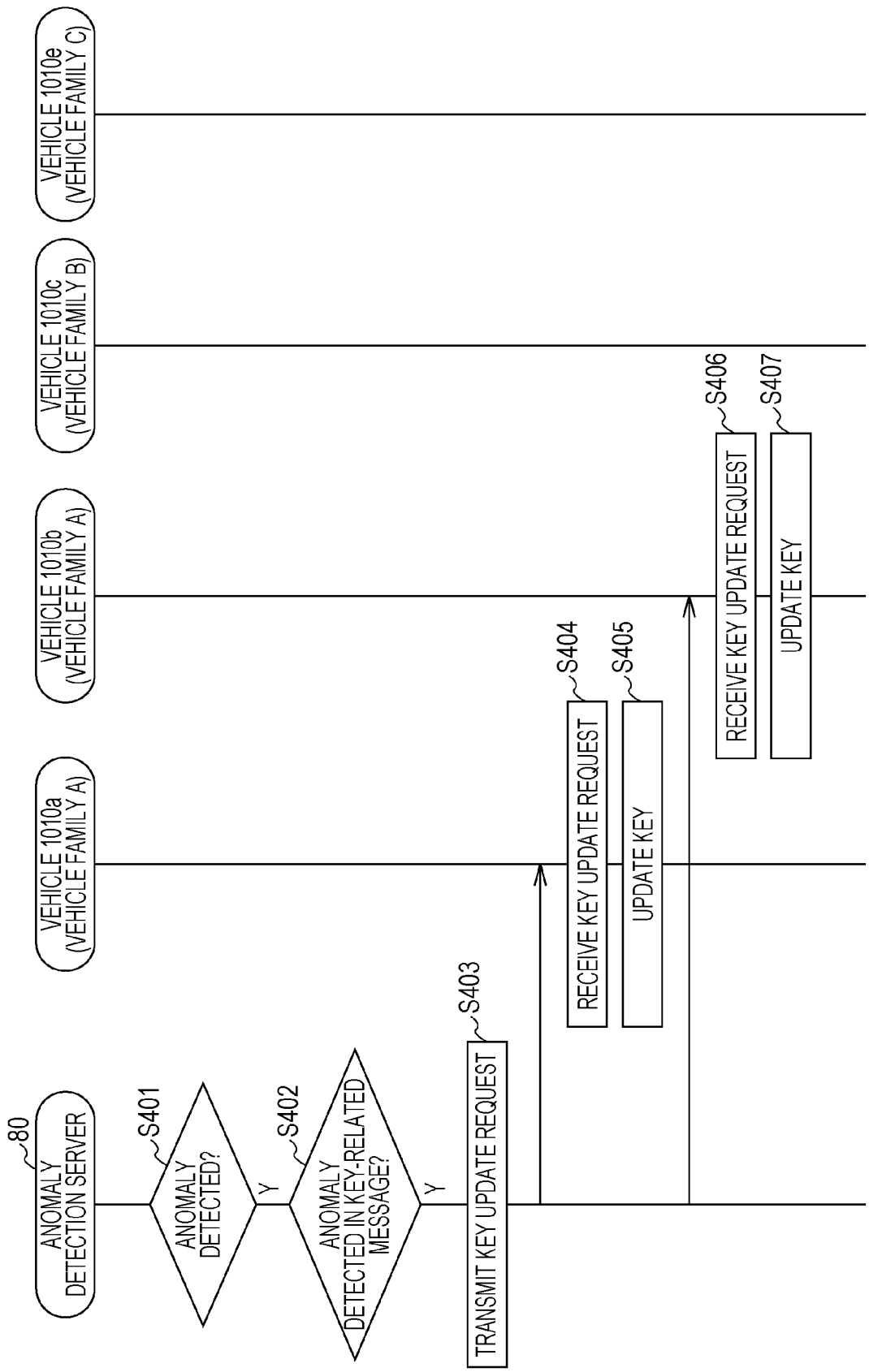
FIG. 15 is a sequence diagram illustrating exemplary operations of a key update request by the anomaly detection server according to Embodiment 3.

FIG. 15 is a sequence diagram illustrating exemplary operations by which the anomaly detection server 80 performs a key update request in response to the detection of an anomaly in which a cryptographic key or a MAC key is estimated to have been leaked.

The anomaly detection server 80 performs the statistical anomaly detection process (S201 of FIG. 11), assesses the anomaly level of a frame received on the on-board network of a certain vehicle (for example, the vehicle 1010*a*), and determines whether or not the frame is anomalous according to whether or not the anomaly level of the frame exceeds a certain threshold value (step S401).

On the basis of the message ID of the frame determined to be anomalous in step S401, the anomaly detection server 80 determines whether or not the frame is a key-related message (a frame for which encryption of the frame content is prescribed, or a frame for which the attachment of a MAC to the frame is prescribed) (step S402).

In step S402, in the case of determining that an anomaly has been detected in a key-related message (that is, in the case of determining that the anomalous frame is a key-related message), the anomaly detection server 80 transmits a key update request (that is, transmission information including control information for giving an instruction to update a key used in the application of cryptographic processing (encryption or MAC attachment) in a vehicle) to the vehicle 1010*a* in which the frame is detected, and also to vehicles having a certain relationship with the vehicle 1010*a* (in these exemplary operations, the vehicle 1010*b* in the same vehicle family) (step S403).

In response, the gateway 90 of the vehicle 1010*a* receives the key update request (step S404), and following the key update request, updates the key stored by the key storage unit 921 (step S405). The key update request transmitted by the anomaly detection server 80 and received by the gateway 90 may also be information including a new key. The anomaly detection server 80 may also include, in the key update request, key-designating information that designates whether the key related to the anomalous frame is an encryption key, a MAC key, or both. In the vehicle 1010*a*, it becomes possible to perform an appropriate key update on the basis of the key-designating information.

Also, similarly, the gateway 90 of the vehicle 1010*b* receives the key update request (step S406), and following the key update request, updates the key stored by the key storage unit 921 (step S407). In the gateway 90, if new key information is included in the key update request, the key is updated to the new key, whereas if new key information is not included, a new key is generated according to a predetermined procedure, and the key is updated to the newly generated key.

Note that in step S403, the anomaly detection server 80 may not only transmit transmission information indicating a key update request to vehicles, but also transmit information related to the leak of a key (a cryptographic key or a MAC key) used in cryptographic processing in an on-board network to devices such as the computers of automobile manufacturers and ECU vendors.

[3.3 Advantageous Effects of Embodiment 3]

In the on-board network management system according to Embodiment 3, in the case of determining that a frame received on the on-board network of a certain vehicle is a key-related message and also an anomalous frame according to an anomaly level assessed for the frame by the anomaly detection server 80, under a fixed condition, transmission information indicating a key update request is transmitted to the vehicle and to vehicles having a certain relationship with the vehicle. With this arrangement, it becomes possible to appropriately counteract the unauthorized usage of a key (cryptographic key or MAC key) used in cryptographic processing by an ECU under the command of an attacker, and the security of the on-board network may be ensured.

Other Embodiments

Besides the service mode described above (see FIG. 1A), the technology according to an on-board network management system illustrated in the foregoing embodiments may be realized in the following cloud service categories, for example. However, the application of the technology illustrated in the foregoing embodiments is not limited to the cloud service categories described herein.
(Service Category 1: Cloud Service with Self-Managed Data Center)

Figure 16:
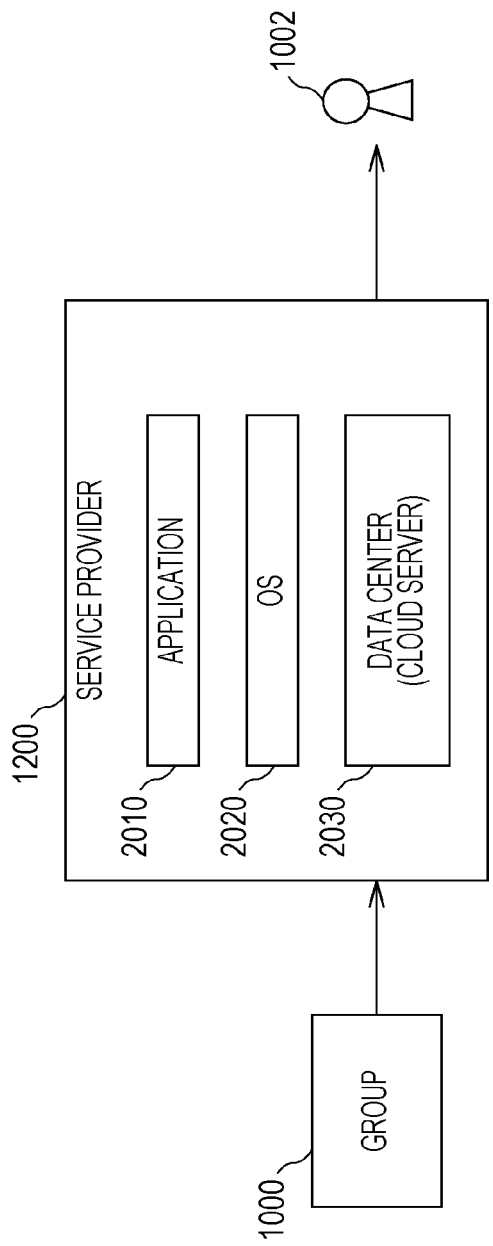
FIG. 16 is a conceptual diagram illustrating a service (Type 1) provided by the on-board network management system.

FIG. 16 is a diagram illustrating an overview of a service provided by an on-board network management system according to a service category 1 (a cloud service with a self-managed data center). In this category, the service provider 1200 acquires information from the group 1000, and provides a service to the user 1002. In this category, the service provider 1200 includes the functionality of a data center operating company. In other words, the service provider 1200 possesses a cloud server 2030 (corresponding to the cloud server 1110) that manages big data. Consequently, a data center operating company does not exist. All or part of the anomaly detection server 80 described above may be realized as the cloud server 2030, for example. In this category, the service provider 1200 includes the cloud server 2030 as a data center that the service provider 1200 operates and manages. The service provider 1200 also manages an operating system (OS) 2020 and an application (application program) 2010. The service provider 1200 provides a service using the OS 2020 and the application 2010. The recipient of the service (for example, the provision of information) in service category 1 or the following categories 2 to 4 is not limited to the user 1002 (such as a business operator of an automobile manufacturer, ECU vendor, or the like, a specific individual, or group, for example), and may also be the user 1001 who uses a vehicle, or a vehicle itself (such as the vehicle 1010a, for example) among the multiple vehicles 1010. For example, the service provider 1200 may provide a service by communicating with a device (such as the gateway 90) of the vehicle 1010a through the cloud server 2030 using the OS 2020 and the application 2010.
(Service Category 2: Cloud Service Utilizing IaaS)

Figure 17:
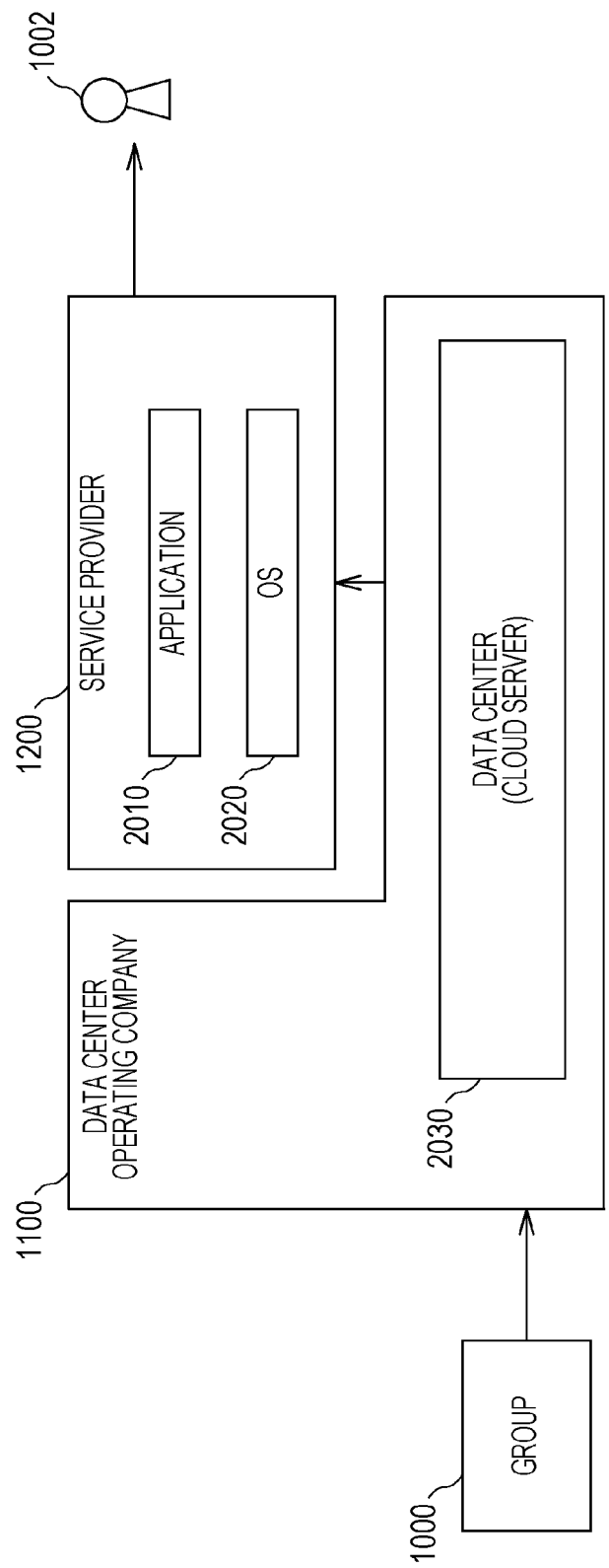
FIG. 17 is a conceptual diagram illustrating a service (Type 2) provided by the on-board network management system.

FIG. 17 is a diagram illustrating an overview of a service provided by an on-board network management system according to a service category 2 (a cloud service utilizing IaaS). Herein, IaaS is an acronym for infrastructure as a service, and refers to a cloud service model in which the infrastructure itself for building and running a computer system is provided as a service via the Internet.

In this category, the data center operating company 1100 operates and manages the data center 2030 (cloud server). The service provider 1200 also manages the OS 2020 and the application 2010. The service provider 1200 provides a service using the OS 2020 and the application 2010 managed by the service provider 1200.
(Service Category 3: Cloud Service Utilizing PaaS)

Figure 18:
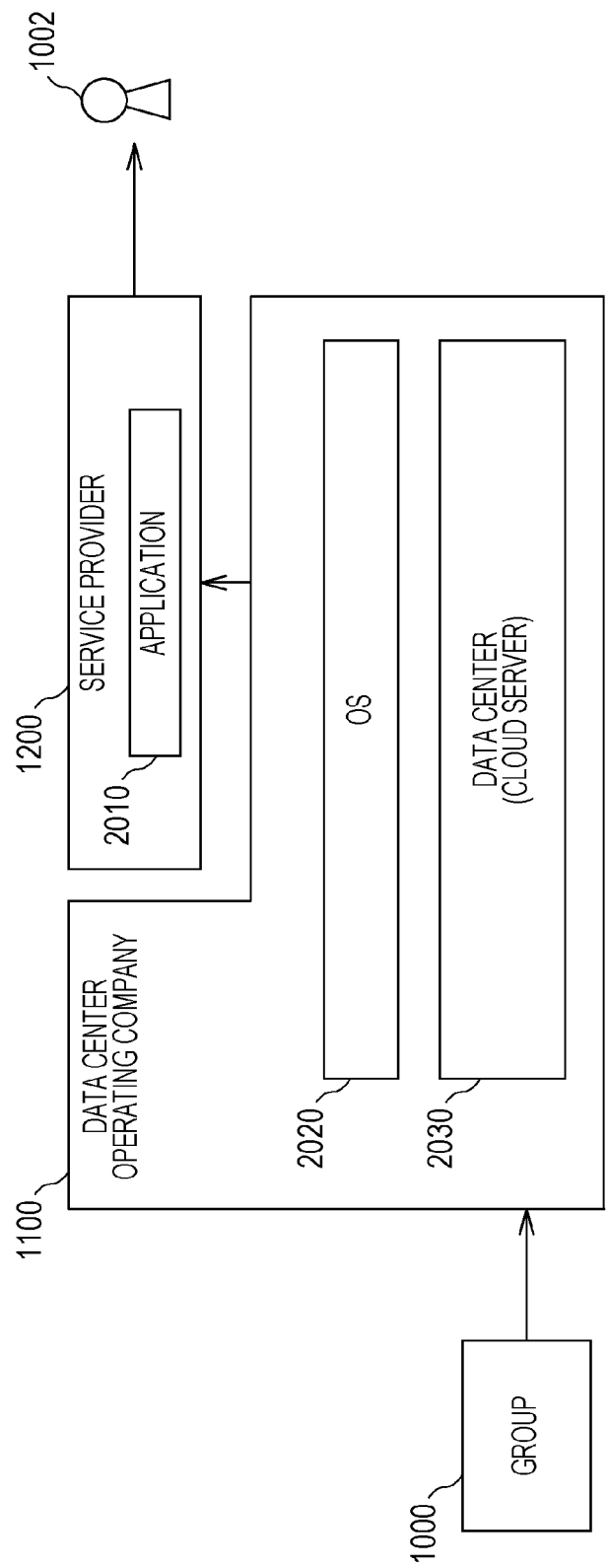
FIG. 18 is a conceptual diagram illustrating a service (Type 3) provided by the on-board network management system.

FIG. 18 is a diagram illustrating an overview of a service provided by an on-board network management system according to a service category 3 (a cloud service utilizing PaaS). Herein, PaaS is an acronym for platform as a service, and refers to a cloud service model in which the underlying platform for building and running software is provided as a service via the Internet.

In this category, the data center operating company 1100 manages the OS 2020, and also operates and manages the data center 2030 (cloud server). Meanwhile, the service provider 1200 manages the application 2010. The service provider 1200 uses the OS 2020 managed by the data center operating company 1100 and the application 2010 managed by the service provider 1200 to provide a service.
(Service Category 4: Cloud Service Utilizing SaaS)

Figure 19:
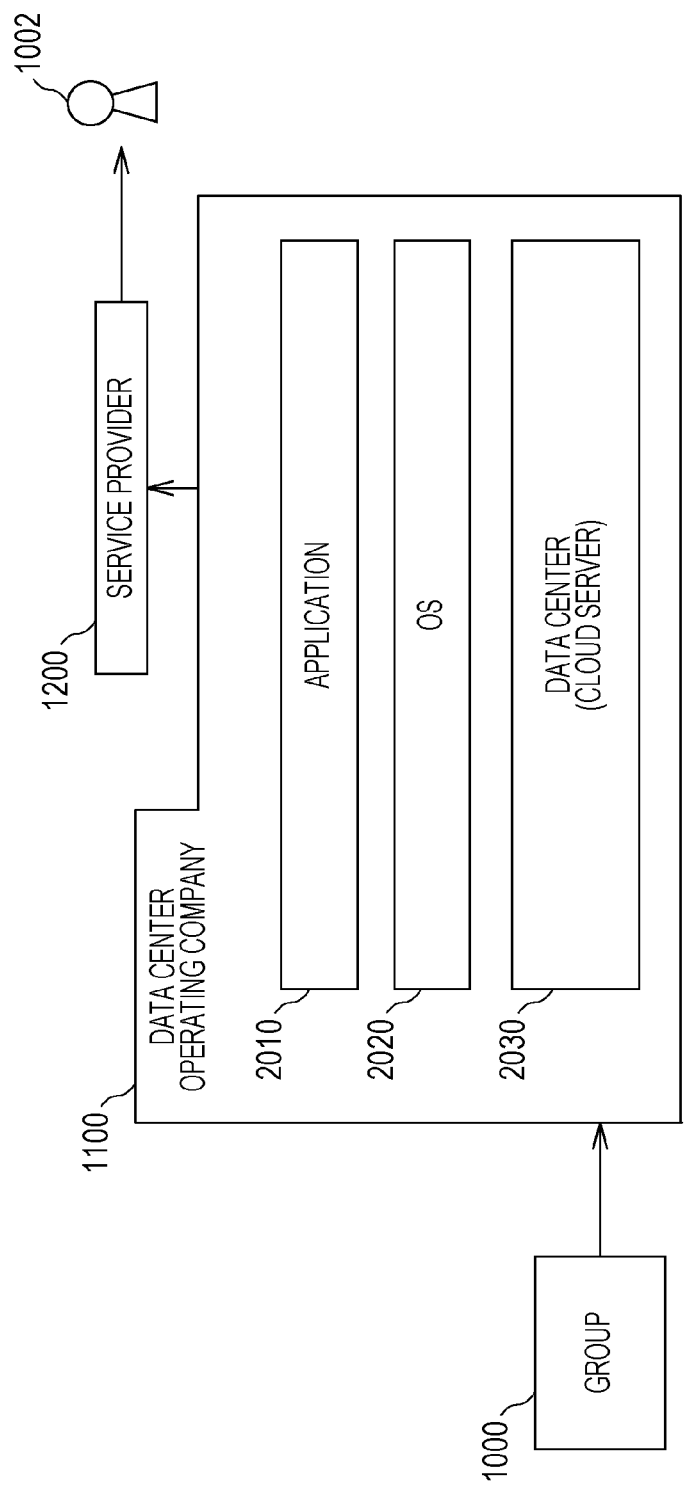
FIG. 19 is a conceptual diagram illustrating a service (Type 4) provided by the on-board network management system.

FIG. 19 is a diagram illustrating an overview of a service provided by an on-board network management system according to a service category 4 (a cloud service utilizing SaaS). Herein, SaaS is an acronym for software as a service. SaaS is a cloud service model that includes functions enabling a user such as a company or individual who does not possess a data center (cloud server) to use an application provided by a platform provider possessing a data center (cloud server), for example.

In this category, the data center operating company 1100 manages the application 2010, manages the OS 2020, and also operates and manages the data center (cloud server) 2030. Also, the service provider 1200 uses the OS 2020 and the application 2010 managed by the data center operating company 1100 to provide a service.

In all of the above cloud service categories, the service provider 1200 provides a service. In addition, for example, the service provider or data center operating company may independently develop software such as the OS, application, or database for big data, or outsource development to a third party.
(Modifications)

The above thus describes Embodiments 1 to 3 as illustrative examples of technology according to the present disclosure. However, the technology according to the present disclosure is not limited thereto, and is also applicable to embodiments obtained by the appropriate modification, substitution, addition, or removal of elements. For example, modifications like the following are also included as modes of the present disclosure.

(1) The foregoing embodiments are described using an example in which a vehicle includes an on-board network (on-board network system) that communicates in accordance with the CAN protocol, but the foregoing embodiments are not limited thereto, and the network class (communication protocol) may be of any type. For example, the on-board network may also be CAN-FD, Ethernet (registered trademark), local interconnect network (LIN), FlexRay (registered trademark), or the like, or a combination of the above. In the above embodiments, the cyber security countermeasure on an onboard network mounted in an automobile has been described, but the applicable range is not limited thereto. The technology according to the present disclosure is not limited to an automobile, and is also applicable to mobility such as a construction machine, an agricultural machine, a ship, a railway, an airplane, or the like. That is to say, the technology according to the present disclosure is applicable to a mobility network and a mobility network system. Further the technology according to the present disclosure is also applicable to a communication network used in an industrial control system such as a factory or a building, or a communication network for controlling an embedded device.

(2) The foregoing embodiments illustrate an example of a statistical anomaly detection process in which the anomaly detection server 80 acquires information about multiple frames received on the on-board network of multiple vehicles, updates a designated model by machine learning and the like on the basis of the acquired information about multiple frames, and by performing computational processing and the like involving comparison against the designated model, assesses the anomaly level of a frame received on the on-board network of the vehicle 1010a after the reception of the multiple frames. However, instead of the anomaly detection server 80, all or part of the statistical anomaly detection process may also be performed by a device inside the vehicle 1010a (for example, the gateway 90 or another ECU). For example, the gateway 90 of the vehicle 1010a may acquire information about multiple frames received on the on-board network of one or multiple vehicles (which may just be the on-board network of the vehicle 1010a, or the on-board networks of other vehicles, for example), updates a designated model by machine learning and the like on the basis of the acquired information about multiple frames, and by performing computational processing and the like involving comparison against the designated model, assesses the anomaly level of a frame received on the on-board network of the vehicle 1010a after the reception of the multiple frames. Subsequently, in accordance with the assessed anomaly level, the gateway 90 may determine whether or not the frame is anomalous, and in the case in which the frame is anomalous, the gateway 90 may warn (issue an alert notification to) the driver or the like, control the running of the vehicle, update a key used when applying cryptographic processing in the vehicle, transmit transmission information (such as an alert notification and control information) to other vehicles, and the like. Note that the device inside the vehicle 1010a may transmit results obtained by performing all or part of the statistical anomaly detection process to a cloud server (for example, the anomaly detection server 80), and the results may be utilized (such as for information provision to a user) in the cloud server.

(3) The foregoing embodiments illustrate an example of executing the statistical anomaly detection process on the anomaly detection server 80 which corresponds to a cloud server or the like, but the statistical anomaly detection process may also be executed by an edge server closer to the local environment (vehicle), and thereby the communication latency may be reduced. For example, the edge server may be a roadside unit, vehicles may upload information about frames received on the on-board network to the roadside unit, and the roadside unit may perform a statistical anomaly detection process and upload anomaly detection results to a cloud server.

(4) The foregoing embodiments illustrate an example in which the frame uploading unit 950 of the gateway 90 performs a treatment process including a process of creating a feature vector or the like. However, either of a device inside the vehicle (such as the frame uploading unit 950) and the anomaly detection server 80 may perform a treatment process on the information about frames received on the on-board network of the vehicle, or both a] device inside the vehicle and the anomaly detection server 80 may share the work of performing the treatment process by an arbitrary distribution.

(5) In the foregoing embodiments, the gateway 90 transmits, to the anomaly detection server 80, log information including information about received frames, regardless of whether the frames are fraudulent frames or not. However, in the case in which the gateway 90 detects that a frame is a fraudulent frame and transmits an error frame, the gateway 90 may also not transmit information about the fraudulent frame (such as a feature vector) to the anomaly detection server 80.

(6) The foregoing embodiments illustrate that the anomaly detection server 80 may control the transmission of information indicating an alert notification and the like to devices such as the computers of automobile manufacturers and ECU vendors. The alert notification may also be transmitted to arbitrary destinations. For example, the anomaly detection server 80 may also transmit transmission information such as an alert notification to an information terminal or the like possessed by a user, or to a security provider which may be utilized jointly by multiple automobile manufacturers.

(7) In the foregoing embodiments, the anomaly detection server 80 assesses the anomaly level of a certain frame by performing the statistical anomaly detection process, and in the case in which the anomaly level is anomalous, for example, the anomaly detection server 80 decides an alert level. Besides the above, the anomaly detection server 80 may also include a function that assesses the anomaly level of the frame by a predetermined algorithm or the like, irrespective of the statistical anomaly detection process, and decides an alert level according to the anomaly level (for example, according to whether or not the anomaly level is anomalous). For example, in the case in which the frame is a frame having a message ID prescribed in advance for a frame used for firmware updates, and the frame is confirmed to be present on the CAN bus outside of an appropriate update period, an anomaly level indicating that the frame is anomalous may be assessed, an alert level may be decided, and an alert notification or the like may be issued. In this case, the alert level may be considered to correspond to Phase 2 of a sign of attack, and the attack phase information (see FIG. 7) may be used to decide the alert level. Also, the anomaly detection server 80 may assess the anomaly level by jointly using the statistical anomaly detection process and a process of detecting a fraudulent frame using predetermined rules or an algorithm for detecting fraudulent frames. In this case, frames detected as fraudulent frames are assessed to have an anomaly level indicating that the frames are anomalous.

(8) The execution order of the steps in the various processes illustrated in the above embodiments (such as the steps illustrated in FIG. 10, FIG. 11, FIG. 13, and FIG. 15, for example) is not necessarily limited to the order given above, and within a scope that does not depart from the gist of the disclosure, it is possible to rearrange the execution order, perform multiple steps in parallel, or skip some steps.

(9) The gateway and other ECUs in the above embodiments are taken to be devices including digital circuits such as a processor and memory, analog circuits, communication circuits, and the like, but may also include hardware components such as a hard disk device, a display, a keyboard, and a mouse. Also, the anomaly detection server 80 is taken to be a computer provided with a processor, memory, a communication interface, and the like, for example, but may also include hardware components such as a hard disk device, a display, a keyboard, and a mouse. Additionally, for each device (such as ECUs and the anomaly detection server 80) illustrated in the foregoing embodiments, instead of realizing functions in software by having a processor execute a control program stored in memory, such functions may also be realized by special-purpose hardware (such as digital circuits).

(10) Some or all of the structural elements constituting each device in the above embodiments may also be configured as a single system large-scale integration (LSI) chip. A system LSI chip is a multi-function LSI chip fabricated by integrating multiple components onto a single chip, and specifically is a computer system including a microprocessor, ROM, RAM, and the like. A computer program is recorded in the RAM. The system LSI chip achieves the functions thereof as a result of the microprocessor operating in accordance with the computer program. In addition, the respective units of the structural elements constituting each of the above devices may be realized individually as separate chips, or as a single chip that includes some or all structural elements. Also, although system LSI is discussed herein, the circuit integration methodology may also be referred to as IC, LSI, super LSI, or ultra LSI, depending on the degree of integration. Furthermore, the circuit integration methodology is not limited to LSI, and may be also be realized with special-purpose circuits or general-purpose processors. A field-programmable gate array (FPGA) capable of being programmed after fabrication, or a reconfigurable processor whose circuit cell connections and settings may be reconfigured, may also be used. Furthermore, if circuit integration technology that may be substituted for LSI appears as a result of progress in semiconductor technology or another derived technology, obviously the new technology may be used to integrate the function blocks. Biotechnology applications and the like are also a possibility.

(11) Some or all of the structural elements constituting each of the above devices may also be configured as an IC card or a separate module that may be inserted into each device. The IC card or the module is a computer system made up of components such as a microprocessor, ROM, and RAM. The IC card or the module may also include the advanced multi-function LSI chip discussed above. The IC card or the module achieves the functions thereof as a result of the microprocessor operating in accordance with the computer program. The IC card or the module may also be tamper-resistant.

(12) One aspect of the present disclosure may be a security processing method that includes all or part of the processing steps illustrated in FIG. 10, FIG. 11, FIG. 13, and FIG. 15, for example. For example, the security processing method is a security processing method for counteracting an anomalous frame transmitted on an on-board network of a single vehicle (for example, the vehicle 1010a), including: acquiring information about multiple frames received on the on-board network of one or multiple vehicles (such as the vehicle 1010b, for example); and assessing an anomaly level of a frame received on the on-board network of the single vehicle (for example, the vehicle 1010a) after the reception of the multiple frames on each on-board network, based on the acquired information about the multiple frames. The security processing method, for example, may also include: a first receiving step of performing the acquisition described above by having the anomaly detection server 80 communicable with the multiple vehicles and the single vehicle (for example, the vehicle 1010a) receive information about multiple frames received on the on-board network of each vehicle from each of the multiple vehicles (for example, multiple vehicles in the vehicle family A) (for example, step S112 of receiving a frame-related feature vector or the like from each of the multiple vehicles in the vehicle family A); a second receiving step of having the anomaly detection server 80 receive information about a frame received on the on-board network of the single vehicle from the single vehicle (for example, step S112 of receiving a frame-related feature vector or the like from the gateway 90 of the vehicle 1010a); an assessing step of performing the assessment of the anomaly level of the frame involving the information about the frame received in the second receiving step, based on the information about the multiple frames received in the first receiving step (for example, step S201 of the statistical anomaly detection process); a deciding step of deciding content of transmission information to be transmitted to the single vehicle in accordance with the anomaly level assessed in the assessing step (for example, step S203 of deciding an alert level concerning the transmission mode); and a transmitting step of the anomaly detection server 80 transmitting the transmission information with the content decided in the deciding step to the single vehicle (for example, the transmitting step S204). Note that the processing in the assessing step and the deciding step (such as the specification of the content of the fraud detection information in the case of including fraud detection information corresponding to the anomaly in the transmission information, for example) may also be executed by a business operator of an automobile manufacturer, an ECU vendor, or the like, or by a computer or the like of such a business operator or the like, for example. Also, for example, the security processing method is a security processing method for counteracting an anomalous frame transmitted on an on-board network of a single vehicle (for example, the vehicle 1010a), including: assessing an anomaly level of a frame received on the on-board network of the single vehicle; and deciding whether or not to transmit transmission information to vehicles having a certain relationship with the single vehicle (such as vehicles in the same vehicle family or vehicles provided with the same type of ECU, for example) in accordance with the assessed anomaly level, and controlling the transmission of the transmission information by following the decision. In addition, one aspect of the present disclosure may be a computer program that realizes processing according to the security processing method with a computer, or a digital signal containing the computer program. In addition, one aspect of the present disclosure may be realized by recording the computer program or the digital signal onto a computer-readable recording medium, such as a flexible disk, hard disk, CD-ROM, MO, DVD, DVD-ROM, DVD-RAM, Blu-ray (registered trademark) Disc (BD), or semiconductor memory, for example. In addition, one aspect of the present disclosure may also be taken to be the digital signal recorded on these recording media. In addition, one aspect of the present disclosure may also be realized by transmitting the computer program or the digital signal over an electrical communication link, a wired or wireless communication link, a network such as the Internet, or a data broadcast. In addition, one aspect of the present disclosure may also be a computer system equipped with a microprocessor and memory, in which the memory records the above computer program, and the microprocessor operates according to the computer program. In addition, one aspect of the present disclosure may also be carried out by another independent computer system by recording and transporting the program or the digital signal on a recording medium, or transporting the program or the digital signal over a medium such as a network.

(13) Embodiments realized by arbitrarily combining the respective structural elements and functions indicated in the above embodiments and the above modifications are also included in the scope of the present disclosure.

The present disclosure is usable for appropriately counteracting a variety of attack frames which may be transmitted on an on-board network.

What is claimed is:

1. A security processing method, executed by a computer, for counteracting an anomalous frame transmitted on an on-board network of a single vehicle, the on-board network of the single vehicle joining multiple electronic control units installed inside the single vehicle that perform a communication of a frame inside the single vehicle, the security processing method comprising:
    acquiring, by the computer, information about multiple frames received on one or multiple on-board networks of one or multiple vehicles; and
    assessing, by the computer, an anomaly level of the frame received on the on-board network of the single vehicle after the reception of the multiple frames, based on the acquired information about the multiple frames, wherein the anomaly level of the received frame is a degree to which said received frame is considered to be anomalous.

2. The security processing method according to claim 1, wherein
    the acquired information about the multiple frames includes at least partial content of the frames,
    an acquisition of the acquired information about the multiple frames is a successive acquisition of information about each of the multiple frames,
    in the security processing method, a designated model is successively updated based on the successively acquired information about the multiple frames, and
    an assessment of the anomaly level of the frame received on the on-board network of the single vehicle is performed by computational processing using information about the frame, and the designated model.

3. The security processing method according to claim 2, wherein
    the designated model is successively updated by machine learning, based on the successively acquired information about the multiple frames.

4. The security processing method according to claim 1, further comprising:
    performing the acquiring by having a server communicable with the one or multiple vehicles and the single vehicle acquire the information about the multiple frames received on the on-board network of each vehicle from each of the one or multiple vehicles;
    having the server receive information about the frame received on the on-board network of the single vehicle from the single vehicle;
    performing an assessment of the anomaly level of the frame involving the information about the frame, based on the information about the multiple frames;
    deciding content of transmission information to be transmitted to the single vehicle in accordance with the anomaly level assessed in the assessment; and
    transmitting, by the server, the transmission information with the content to the single vehicle.

5. The security processing method according to claim 4, wherein
    the information about the frame received on the on-board network of the single vehicle includes identification information of the frame, and
    in the deciding, the content of the transmission information is decided in accordance with the identification information of the frame in a case in which the anomaly level of the frame assessed in the assessment indicates that the frame is anomalous.

6. The security processing method according to claim 5, wherein
    in the deciding, in a case in which the identification information of the frame whose anomaly level is assessed to indicate that the frame is anomalous in the assessment is certain identification information, control information giving an instruction to stop running or reduce a running speed of the single vehicle is included in the transmission information.

7. The security processing method according to claim 4, wherein
    in the transmitting, it is decided, as a decision, whether or not to transmit certain transmission information to vehicles having a certain relationship with the single vehicle in accordance with the anomaly level assessed in the assessment, and a transmission of the certain transmission information is controlled by following the decision.

8. The security processing method according to claim 7, wherein
    the information about the frame received on the on-board network of the single vehicle includes identification information of the frame, and
    in the transmitting, it is decided whether or not to transmit the certain transmission information to vehicles having a same configuration of the on-board network as the single vehicle, in accordance with the identification information of the frame in a case in which the anomaly level of the frame assessed in the assessment indicates that the frame is anomalous, and a transmission of the certain transmission information is controlled by following the decision.

9. The security processing method according to claim 7, wherein
    the information about the frame received on the on-board network of the single vehicle includes identification information of the frame, and
    in the transmitting, it is decided whether or not to transmit the certain transmission information to vehicles provided with an electronic controller of a same type as an electronic controller that transmits the frame identified by the identification information in the on-board network of the single vehicle, in accordance with the identification information of the frame in a case in which the anomaly level of the frame assessed in the assessment indicates that the frame is anomalous, and a transmission of the certain transmission information is controlled by following the decision.

10. The security processing method according to claim 4, wherein
    in the transmitting, a transmission time of transmission information to transmit to the single vehicle is decided in accordance with the anomaly level assessed in the assessment, and the transmission information is transmitted to the single vehicle at the transmission time.

11. The security processing method according to claim 4, wherein
    in the deciding, in a case in which the anomaly level of the frame assessed in the assessment indicates that the frame is anomalous, when a same anomaly as an anomaly related to the frame is already occurring in one or multiple vehicles having a same configuration of the on- board network as the single vehicle, the content of the transmission information to be transmitted to the single vehicle is decided based on a number of vehicles in which the anomaly is occurring or a distance between the single vehicle and the vehicles in which the anomaly is occurring.

12. The security processing method according to claim 4, wherein
in the deciding, in a case in which the anomaly level of the frame assessed in the assessment indicates that the frame is anomalous, fraud detection information indicating a rule or an algorithm for detecting a same anomaly as an anomaly on the on-board network is included in the transmission information.

13. The security processing method according to claim 4, wherein
the information about the frame received on the on-board network of the single vehicle includes identification information of the frame, and
in the deciding, in a case in which the anomaly level of the frame assessed in the assessment indicates that the frame is anomalous, when the identification information of the frame is prescribed in advance for a frame for transmitting data by applying cryptographic processing technology, control information giving an instruction to update a key used when applying the cryptographic processing technology is included in the transmission information.

14. The security processing method according to claim 1, further comprising:
deciding whether or not to transmit transmission information to vehicles having a certain relationship with the single vehicle in accordance with the assessed anomaly level, and controlling the transmission of the transmission information by following the decision.

15. A server for counteracting an anomalous frame transmitted on an on-board network of a single vehicle, the on-board network of the single vehicle joining multiple electronic control units installed inside the single vehicle that perform a communication of a frame inside the single vehicle, the server comprising:
processing circuitry; and
a storage including at least one set of instructions that, when executed by the processing circuitry, causes the processing circuitry to perform operations including:
acquiring information about multiple frames received on one or multiple on-board networks of one or multiple vehicles, the one or multiple vehicles including the single vehicle; and
assessing, based on the acquired information about the multiple frames and information about the frame received on the on-board network of the single vehicle acquired after an acquisition with respect to the multiple frames, an anomaly level of the frame received on the on-board network of the single vehicle, wherein the anomaly level of the received frame is a degree to which said received frame is considered to be anomalous.

16. A security processing method, executed by a computer, for counteracting an anomalous frame transmitted on an on-board network of a single vehicle, the on-board network of the single vehicle joining multiple electronic control units installed inside the single vehicle that perform a communication of a frame inside the single vehicle, the security processing method comprising:
assessing, by the computer, an anomaly level of the frame received on the on-board network of the single vehicle; and
deciding, by the computer, whether or not to transmit transmission information to vehicles having a certain relationship with the single vehicle in accordance with the assessed anomaly level, wherein the anomaly level of the received frame is a degree to which said received frame is considered to be anomalous; and
controlling, by the computer, a transmission of the transmission information by following a decision of the deciding.

17. A security processing method, executed by a computer, for counteracting an anomalous frame transmitted on an on-board network of a single mobility, the on-board network of the single mobility joining multiple electronic control units installed inside the single mobility that perform a communication of a frame inside the single mobility, the security processing method comprising:
acquiring, by the computer, information about multiple frames received on one or multiple on-board networks of one or multiple mobility; and
assessing, by the computer, an anomaly level of the frame received on the on-board network of the single mobility after the reception of the multiple frames, based on the acquired information about the multiple frames, wherein the anomaly level of the received frame is a degree to which said received frame is considered to be anomalous.

* * * * *